(12) United States Patent
Mitsumoto

(10) Patent No.: US 9,771,101 B2
(45) Date of Patent: Sep. 26, 2017

(54) VEHICULAR STEERING CONTROL DEVICE

(71) Applicant: TOYOTA JIDOSHA KABUSHIKI KAISHA, Toyota-shi, Aichi-ken (JP)

(72) Inventor: Hisanori Mitsumoto, Gotenba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/113,518

(22) PCT Filed: Jan. 22, 2015

(86) PCT No.: PCT/JP2015/052417
§ 371 (c)(1),
(2) Date: Jul. 22, 2016

(87) PCT Pub. No.: WO2015/111759
PCT Pub. Date: Jul. 30, 2015

(65) Prior Publication Data
US 2017/0008557 A1    Jan. 12, 2017

(30) Foreign Application Priority Data
Jan. 24, 2014    (JP) .................................. 2014-011794

(51) Int. Cl.
*B62D 6/00*    (2006.01)
*B62D 1/28*    (2006.01)
(Continued)

(52) U.S. Cl.
CPC ............. *B62D 6/003* (2013.01); *B62D 1/286* (2013.01); *B62D 3/126* (2013.01); *B62D 5/008* (2013.01);
(Continued)

(58) Field of Classification Search
None
See application file for complete search history.

(56) References Cited

U.S. PATENT DOCUMENTS 4,778,023 A * 10/1988 Sugasawa .............. B62D 7/159
180/415
5,906,645 A * 5/1999 Kagawa ................... B60T 7/12
180/167

(Continued)

FOREIGN PATENT DOCUMENTS

| JP | 11-268620 A | 10/1999 |
| JP | 2006-96187 A | 4/2006 |
| WO | 2014/073075 A1 | 5/2014 |

*Primary Examiner* — Jonathan M Dager
(74) *Attorney, Agent, or Firm* — Sughrue Mion, PLLC

(57) ABSTRACT

A vehicular steering control device 10 comprises a rudder angle variable device 14 which alters relationship between an operating position of a steering wheel 20 and an operating position of the steering wheel found from a rudder angle of steered wheels 18FL and 18FR, and a rudder angle control device 16 which performs an automatic steering control which controls the rudder angle of the steered wheels by controlling the rudder angle variable device. When a steering mode is switched from an automatic steering mode to a manual steering mode (S150), the rudder angle control device gradually reduces a control gain Klka of the automatic steering mode (S600), and reduces by degrees a size of a deviation between the two operating positions (S400, 500, 800~1000), only when the steering operation is performed by a driver (S350).

6 Claims, 16 Drawing Sheets

(51) Int. Cl.
*B62D 5/00* (2006.01)
*B62D 15/02* (2006.01)
*B62D 3/12* (2006.01)
*B62D 5/04* (2006.01)
*B62D 6/10* (2006.01)
*G05D 1/02* (2006.01)

(52) U.S. Cl.
CPC ............ *B62D 5/0463* (2013.01); *B62D 6/10* (2013.01); *B62D 15/025* (2013.01); *G05D 1/0212* (2013.01)

(56) References Cited

U.S. PATENT DOCUMENTS

| | | | | |
|---|---|---|---|---|
| 5,991,675 A | * | 11/1999 | Asanuma | B60G 17/0195 180/422 |
| 6,050,359 A | * | 4/2000 | Mouri | B62D 7/159 180/168 |
| 6,116,372 A | * | 9/2000 | Mukai | B62D 5/0463 180/443 |
| 6,152,255 A | * | 11/2000 | Noro | B62D 6/007 180/443 |
| 6,594,569 B2 | * | 7/2003 | Yasuda | B62D 5/0457 180/443 |
| 9,342,074 B2 | * | 5/2016 | Dolgov | B60W 30/00 |
| 2007/0198145 A1 | * | 8/2007 | Norris | H04L 67/12 701/23 |
| 2012/0046817 A1 | * | 2/2012 | Kindo | G05D 1/0061 701/23 |
| 2012/0197496 A1 | | 8/2012 | Limpibunterng et al. | |
| 2012/0203430 A1 | * | 8/2012 | Shimada | B62D 6/007 701/41 |
| 2013/0002416 A1 | * | 1/2013 | Gazit | B62D 1/28 340/438 |
| 2015/0151786 A1 | * | 6/2015 | Fujii | B62D 6/008 701/42 |
| 2015/0291214 A1 | * | 10/2015 | Mitsumoto | B62D 6/002 701/41 |
| 2015/0353125 A1 | * | 12/2015 | Tsubaki | B62D 1/286 701/42 |
| 2016/0016606 A1 | * | 1/2016 | Tsubaki | B62D 5/0472 701/41 |
| 2017/0057542 A1 | * | 3/2017 | Kim | B62D 15/025 |
| 2017/0106903 A1 | * | 4/2017 | Moretti | B62D 6/00 |
| 2017/0174258 A1 | * | 6/2017 | Yamada | B62D 6/002 |

* cited by examiner

VEHICULAR STEERING CONTROL DEVICE

TECHNICAL FIELD

The present invention relates to a vehicular steering control device which performs an automatic steering control which automatically steers a steered wheel for the purpose of a trajectory control of a vehicle, and the like.

BACKGROUND ART

In a vehicle in which an automatic steering control is used, a steering mode is switched between a manual steering mode and an automatic steering mode. In the manual steering mode, a rudder angle of the steered wheel is controlled according to an operating position of a steering input device which is operated by a driver. In contrast, in the automatic steering mode, a target rudder angle of the steered wheel for the automatic steering is calculated, and a rudder angle variable device is controlled so that the rudder angle of the steered wheel becomes the target rudder angle. Then, when a predetermined initiation condition for the automatic steering is satisfied, the steering mode is switched from the manual steering mode to the automatic steering mode, and conversely, when a predetermined termination condition for the automatic steering is satisfied, the steering mode is switched from the automatic steering mode to the manual steering mode.

In particular, when the steering mode is switched from the automatic steering mode to the manual steering mode, a gain of the automatic steering control is decreased from 1 to 0, the gain being a ratio of an actual modification amount of the rudder angle to a modification amount for the target rudder angle of the steered wheel for adjusting the rudder angle of the steered wheel to the target rudder angle for the automatic steering control. By this, the steered wheel becomes steerable according to a driver's steering operation.

Therefore, for example, as disclosed in the following patent document 1, it is known that when the steering mode is switched from the automatic steering mode to the manual steering mode, the gain of the automatic steering control is gradually reduced so that a "steering characteristic" (a characteristic of change of a rudder angle of a steered wheel in response to a steering operation) is not rapidly changed. When the steering mode is switched from the automatic steering mode to the manual steering mode, if the gain of the automatic steering control is gradually reduced, an overriding degree of the manual steering to the automatic steering by the automatic steering control is gradually increased. Therefore, compared to a case in which the gain of the automatic steering control is abruptly reduced to 0, it is possible to reduce unusual feeling which is felt by a driver due to the change in the overriding degree.

RELATED ART DOCUMENT

Patent Document

[Patent Document 1] Japanese Patent Application Laid-Open No. 11-286280

SUMMARY OF INVENTION

Problem to be Solved by the Invention

Even if the gain of the automatic steering control is gradually reduced as the steering mode is switched from the automatic steering mode to the manual steering mode, when a steering operation is intermittently performed by a driver, the overriding degree of the manual steering to the automatic steering varies at each steering operation. Therefore, the steering characteristic varies at each steering operation, inevitably causing a driver to have the unusual feeling.

The main subject of the present invention is to reduce the concern that a driver feels the unusual feeling due to the difference of the steering characteristic in each steering operation, even if the steering operation is intermittently performed by a driver, when the steering mode is switched from the automatic steering mode to the manual steering mode.

Means for Solving the Problem and Effects of the Invention

The present invention provides a vehicular steering control device, comprising a rudder angle variable device which varies the rudder angle of the steered wheel, and a rudder angle control device which controls the rudder angle variable device, wherein the steering mode is switched between a manual steering mode which controls the rudder angle of the steered wheel according to an operating position of a steering input device which is operated by a driver, and an automatic steering mode in which a target rudder angle of the steered wheel is calculated and the rudder angle of the steered wheel is controlled to become the target rudder angle by the rudder angle variable device. The vehicular steering control device is characterized in that the rudder angle control device gradually reduces a control gain, only when the operating position of the steering input device is changed by a driver, when the steering mode is switched from the automatic steering mode to the manual steering mode, provided that the control gain of the automatic steering mode is a ratio of an actual modification amount of the rudder angle to a modification amount for a target rudder angle of the steered wheel for adjusting the rudder angle of the steered wheel to the target rudder angle.

According to the above structure, when the steering mode is switched from the automatic steering mode to the manual steering mode, the control gain is gradually reduced only when the operating position of the steering input device is changed by a driver, in other words, only when the steering operation is performed by a driver. Thus, during a steering-holding time when the steering operation is not performed by a driver, the control gain is not decreased. Therefore, even if a steering operation was intermittently performed by a driver, it is possible to reduce the concern that a driver feels the unusual feeling due to the steering characteristics being different in each steering operation, since the steering characteristics at a time of termination and at a time of resumption of the steering operation are identical.

Also, according to the present invention, in the above structure, the rudder angle variable device is capable of altering the relationship between an operating position of the steering input device and an operating position of the steering input device found from a rudder angle of the steered wheel; and the rudder angle control device may be configured to make the size of the deviation between the two operating positions smaller by degrees, when the steering mode is switched from the automatic steering mode to the manual steering mode, only when the operating position of the steering input device is changed by a driver; and to gradually reduce the control gain only when the operating position of the steering input device is changed by a driver, by controlling the control gain according to the size of the deviation between the two operating positions, so that the control gain becomes smaller, as the size of the deviation between the two operating positions becomes smaller.

Generally, an automatic steering mode sometimes go into a situation where a rotated position of a steering wheel used as a steering input device is different from a rotated position of a steering wheel which is found from a rudder angle of the steered wheel, in other words, in a situation so called N (neutral) deviation. Therefore, a vehicle in which an automatic steering control is performed is configured to carry out a so called N deviation reduction control which reduces the size of deviation amount between a rotated position of a steering wheel and a rotated position of a steering wheel found from the rudder angle of the steered wheel (N deviation amount), when the steering mode is switched from the automatic steering mode to the manual steering mode.

In the N deviation reduction control, there is a concern that a driver feels an unusual feeling due to the rudder angle of the steered wheel making an unexpected change, as the steered wheel is steered by the rudder angle variable device to a direction in which the N deviation amount is decreased. Therefore, when the steering mode is switched from the automatic steering mode to the manual steering mode, it is necessary to reduce not only the unusual feeling due to the steering characteristics being different in each steering operation, but also the unusual feeling due to the reduction of the N deviation.

According to the above structure, the size of the deviation between the two operating positions is made smaller by degrees, only when the operating position of the steering input device is changed by a driver. Furthermore, the control gain of the automatic steering mode becomes smaller, as the size of the deviation between the two operating positions becomes smaller, namely, the magnitude of the N deviation amount becomes smaller.

Accordingly, as the N deviation is reduced by the N deviation reduction control, and as the size of the deviation between the two operating positions becomes smaller, the control gain of the automatic steering mode becomes smaller, and accordingly, the control gain is decreased by degrees only when the operating position of the steering input device is changed by a driver. Consequently, it is possible to reduce both the unusual feeling due to the N deviation reduction and the unusual feeling due to the steering characteristics being different in each steering operation, when the steering mode is switched to the manual steering mode, by gradually reducing the N deviation amount and the control gain, only when the steering operation is performed by a driver.

Also, according to the present invention, in the above structure, the rudder angle control device may be configured to make the velocity of reducing the size of the deviation between the two operating positions the higher, the higher the velocity of changing the operating position is, and to make magnitude of the reduction rate of the control gain in the gradual reduction of the control gain the lower, the higher the velocity of changing the operating position is.

When the velocity of reducing the size of the deviation between the two operating positions is made the higher, the higher the velocity of changing the operating position or the velocity of the steering operation is, in the condition where velocity of the steering operation is low, it is possible to lower the velocity of reducing the N deviation to thereby reduce the concern that a driver feels the unusual feeling. Conversely, in the condition where velocity of the steering operation is high, it is possible to make the velocity of reducing the N deviation high, to swiftly reduce the N deviation. However, if the velocity of reducing the size of the deviation between the two operating positions is increased, as the velocity of the steering operation is high, the size of the deviation between the two operating positions is also rapidly decreased, and therefore, the control gain of the automatic steering mode rapidly becomes smaller, and as a result, the overriding degree of the manual steering to the automatic steering abruptly becomes high. Consequently, it is impossible to effectively reduce the rapid change in the steering characteristic during the N deviation reduction control, and the concern that a driver feels the unusual feeling resulted by this rapid change.

According to the above structure, the higher the velocity of the steering operation is, the lower magnitude of the reduction rate of the control gain of the automatic steering mode becomes. Therefore, in contrast to the case where the magnitude of the reduction rate of the control gain of the automatic steering mode is not lowered even if the velocity of the steering operation becomes higher, it is possible to inhibit the speed of the decrease of the control amount of the automatic steering mode from becoming the higher, the higher the velocity of the steering operation is. Thus, it is possible to reduce the rapid change in the steering characteristic, and the concern that a driver feels the unusual feeling resulted by this rapid change, even if the velocity of steering operation is made higher during the N deviation reduction control.

Furthermore, according to the present invention, in the above structure, the rudder angle control device may be configured: to calculate the first control gain on the basis of the size of the deviation between the two operating positions, so as to be smaller as the size of the deviation between the two operating positions becomes smaller; to calculate the second control gain which is decreased in accordance with an integrated value of the time during which the steering input device is operated by a driver, with magnitude of the rate of the decrease becoming the lower, the higher the velocity of the steering operation is; and to set the larger value of the first and second control gains as the control gain.

The above structure calculates the first control gain which becomes smaller as the size of the deviation between the two operating positions becomes smaller, and the second control gain which is decreased in accordance with an integrated value of the time during which the steering input device is operated by a driver, with rate of the decrease becoming the lower, the higher the velocity of the steering operation is. Then, the larger value of the control gains is set as the control gain of the automatic steering mode. Accordingly, it is possible to make the control gain of the automatic steering mode smaller as the size of the deviation between the two positions becomes smaller, and in accordance with the integrated value of the time during which the steering operation is performed by a driver, and it is also possible to inhibit the control gain of the automatic steering mode from becoming smaller as the velocity of the steering operation becomes higher. Therefore, it is possible to reduce the rapid change in the steering characteristic during the N deviation reduction control, and the concern that a driver feels the unusual feeling resulted by this rapid change, regardless of the high/low velocity of steering operation.

Furthermore, according to the present invention, in the above structure, when the size of the deviation between the two operating positions is equal to or less than a reference value, the control gain may be 0.

According to the above structure, when the size of the deviation between the two operating positions is decreased to become equal to or less than the reference value, the control gain of the automatic steering mode becomes 0. Thus, it is possible to prevent that the control amount of the automatic steering mode does not become 0, even when the size of the deviation between the two operating positions becomes equal to or less than the reference value. Accordingly, it is possible to prevent the rapid change in the steering characteristic by reducing the control amount of the automatic steering mode by degrees as the size of the deviation between the two operating positions is decreased, and to securely terminate the automatic steering mode, when the N deviation reduction is completed.

Also, according to the present invention, in the above structure, the rudder angle control device may be configured to: calculate a target rudder angle of the steered wheel on the basis of a target turning state amount of the vehicle for the automatic steering and on the basis of the control gain; modify the target rudder angle by the modification amount to make the size of the deviation between the two operating positions smaller; and control the rudder angle variable device on the basis of the modified target rudder angle, when the steering mode is switched from the automatic steering mode to the manual steering mode.

According to the above structure, a target rudder angle of the steered wheel is calculated on the basis of a target turning state amount of a vehicle and the control gain; the target rudder angle is modified by the modification amount to make the size of the deviation between the two operating positions smaller; and the rudder angle variable device is controlled on the basis of the modified target rudder angle. Thus, it is possible, during the N deviation reduction control, to gradually reduce the gain of the automatic steering mode, with modifying the target rudder angle of the automatic steering mode, so that the size of the deviation between the two operating positions becomes smaller. Accordingly, it is possible to gradually reduce the control amount of the automatic steering mode, in the process of making the size of the deviation between the two operating positions smaller.

DESCRIPTION OF EMBODIMENTS

The present invention will be explained in detail with respect to its preferred embodiments, referring the figures attached below.

First Embodiment

Figure 1:
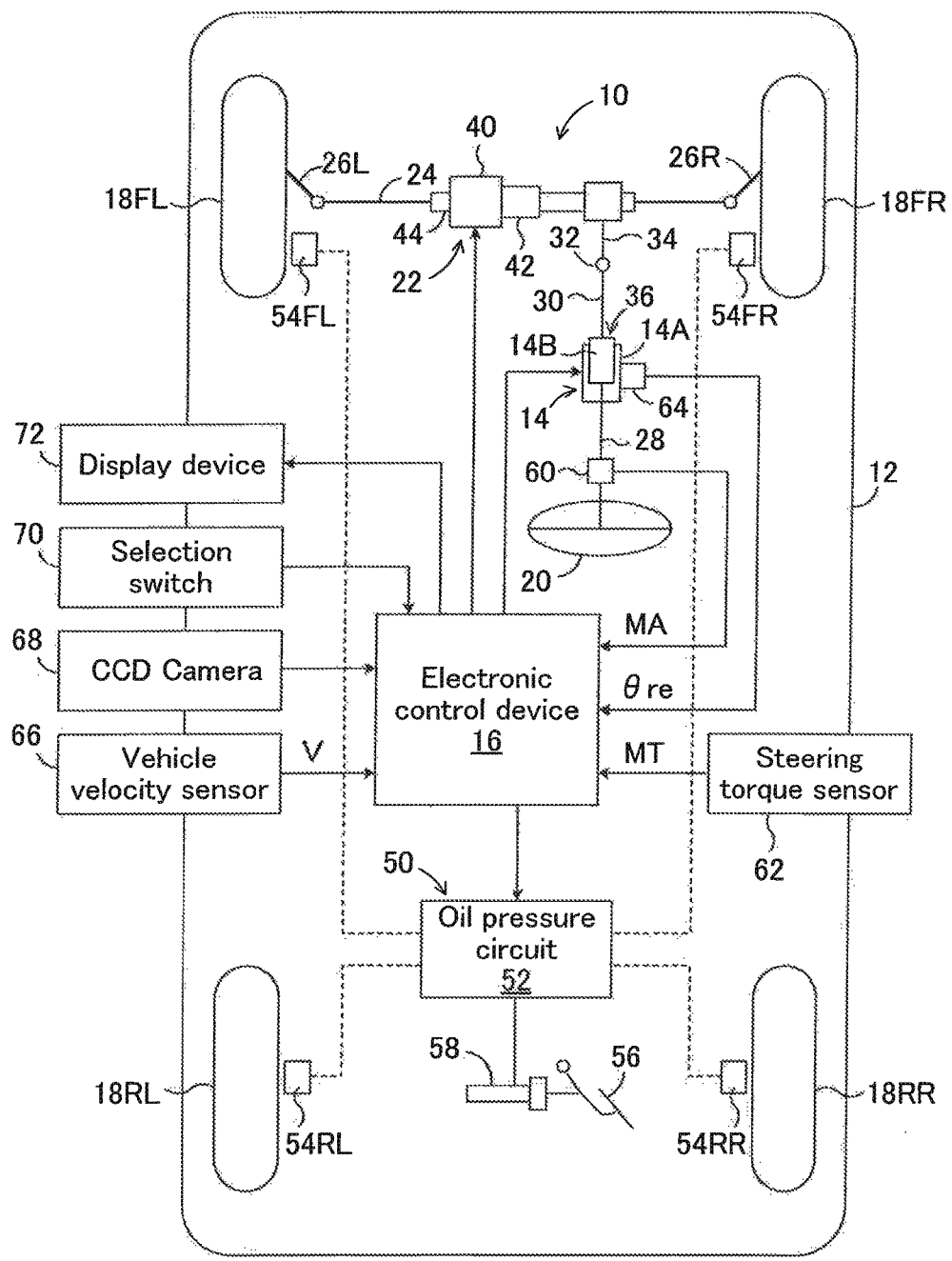
FIG. 1 is a schematic block diagram showing the first embodiment of a vehicular steering control device according to the present invention applied in a vehicle in which an electric power steering device is installed.

FIG. 1 shows a vehicular steering control device 10 according to the first embodiment of the present invention installed in a vehicle 12. The vehicular steering control device 10 comprises a rudder angle variable device 14 and an electronic control device 16 which controls the rudder angle variable device 14, and the electronic control device 16 functions as a rudder angle control device of the present invention. The vehicle 12 comprises left and right front wheels 18FL and 18FR which are steered wheels and left and right rear wheels 18RL and 18RR which are non-steered wheels. The left and right front wheels 18FL and 18FR are turned through rack bar 24, tie rods 26L and 26R, by an Electric Power Steering device (EPS) 22 which is driven in response to the operation of a steering wheel 20 by a driver.

The steering wheel 20 as a steering input device is linked to a pinion shaft 34 in the Electric Power Steering device 22, through an upper steering shaft 28, the rudder angle variable device 14, a lower steering shaft 30, and a universal joint 32. The rudder angle variable device 14 comprises an electric motor 36 for a turning drive. The electric motor 36 is linked to the lower end of the upper steering shaft 28 by its side of a housing 14A, and linked to the upper end of the lower steering shaft 30 by its side of a rotor 14B via a speed reducer (not shown in the figure).

The rudder angle variable device 14 turns the left and right front wheels 18FL and 18FR by driving them relatively to the steering wheel 20, by relatively rotating the upper steering shaft 28 and the lower steering shaft 30. Thus, the rudder angle variable device 14 serves as a Variable Gear Ratio Steering device (VGRS) which varies a steering gear ratio (an inverse of steering transmission ratio). In addition, the rudder angle variable device 14 alters the relationship between the rotated position of steering wheel 20 and a rudder angle of the front wheels by varying the rudder angle of the left and right front wheels, regardless whether or not there is an operation by a driver. As will be explained in detail later, the rudder angle variable device 14 is controlled by a rudder angle control unit of the electronic control device 16.

In the illustrated embodiment, the Electric Power Steering device 22 is a rack concentric type electric power steering device, and includes an electric motor 40 and a conversion mechanism 42, for example, of a ball-screw type, that converts the rotational torque of the electric motor 40 into a force in a reciprocating direction of the rack bar 24. The Electric Power Steering device 22 is controlled by an EPS control unit of the electronic control device 16. The Electric Power Steering device 22 generates a subservient steering power which drives the rack bar 24 relatively to housing 44, to thereby alleviate steering load of a driver and to serve as a steering assist force generating means which assists the functioning of the rudder angle variable device 14.

Incidentally, the rudder angle variable device 14 and the steering assist force generating means may be devices with any structure as far as they are capable of varying the rudder angle of the left and right front wheels without a steering operation of a driver, or varying the rotation angle of the steering wheel 20, in cooperation with each other. As the steering input device is the steering wheel 20, an "operating position of the steering input device" is a rotation angle of the steering wheel 20. However, the steering input device may also be a steering lever of joystick type. In that case, an "operating position of the steering input device" is a reciprocating operating position of the steering lever.

Braking force for each wheel is controlled in such a manner that pressure within wheel cylinders 54FL, 54FR, 54RL, and 54RR, namely a braking pressure, is controlled by an oil pressure circuit 52 of a braking device 50. The oil pressure circuit 52 comprises, although not shown in FIG. 1, an oil reservoir, an oil pump, and various valve devices. The braking pressure for each wheel cylinder is controlled by a master cylinder 58 which is driven in response to pedaling operation by a driver to a brake pedal 56, in a usual time. Furthermore, the braking pressure for each wheel cylinder is individually controlled as needed, by the oil pressure circuit 52 being controlled by a braking force control unit of the electronic control device 16. The braking device 50 is capable of individually controlling the braking force for each wheel, regardless of braking operation by a driver.

The upper steering shaft 28 is provided with a steering angle sensor 60 which detects a rotation angle of the upper steering shaft as a steering angle MA. The pinion shaft 34 is provided with a steering torque sensor 62 which detects a steering torque MT. The rudder angle variable device 14 is provided with a rotation angle sensor 64 which detects a rotation angle of the lower steering shaft 30 to the upper steering shaft 28 as a relative rotation angle θre. The steering angle sensor 60, the steering torque sensor 62, and the rotation angle sensor 64 detect the steering angle MA, the steering torque MT, and the relative rotation angle θre respectively, on the basis that steering or turning of a vehicle to the left turning direction should be detected as a positive value.

A signal indicative of the steering angle MA, a signal indicative of the steering torque MT, and a signal indicative of the relative rotation angle θre, together with a signal indicative of a vehicle velocity V detected by a vehicle velocity sensor 66, are input to the rudder angle control unit and the EPS controlling unit of the electronic control device 16. Incidentally, it is also possible that the rotation angle of the lower steering shaft 30 is detected, and then, the relative rotation angle θre is obtained as a difference between the steering angle MA and the rotation angle of the lower steering shaft 30.

The EPS control unit of the electronic control device 16 alleviates steering load of a driver by controlling the EPS 22 on the basis of the steering torque MT, etc., and assists the rudder angle variable device 14 in controlling a rudder angle of the front wheels, or in controlling the rotated position of the steering wheel 20.

The vehicle 12 is provided with a CCD camera 68 which photographs a forward view of the vehicle, and a selection switch 70 which is operated by a passenger of the vehicle. The selection switch 70 is used to select whether or not to perform a trajectory control (also called as "LKA (Lane Keeping Assist) control") which makes the vehicle travel along a travelling road. A signal indicative of image information of the forward view of the vehicle photographed by the CCD camera 68, and a signal indicative of a position of the selection switch 70 are input to a driving control unit of the electronic control device 16. The CCD camera 68 preferably is a stereo camera capable of measuring a distance between an object in front of the vehicle and the vehicle itself. The image information of the forward view of the vehicle or information on a travelling road may be obtained by means other than a CCD camera.

When the selection switch 70 is on, the steering mode is set to an automatic steering mode, and steering characteristic control and automatic steering control for the trajectory control are performed as a usual steering control. To the contrary, when the selection switch 70 is off, the steering mode is set to a manual steering mode, and the rudder angle of the front wheels is controlled according to the rotated position of the steering wheel 20, and the steering characteristic control is performed. Besides, when the selection switch 70 is switched from on to off, the steering mode is switched from the automatic steering mode to the manual steering mode. When the steering mode is switched from the automatic steering mode to the manual steering mode, a termination control which terminates the trajectory control by gradually reducing the gain for the trajectory control is performed, only when the steering operation is performed by a driver.

When the trajectory control is terminated, if the steering angle MA and a steering angle MAs which is found from a rudder angle δf of the left and right front wheels are inconsistent with each other (N deviation occurs), an N deviation reduction control to reduce the size of the difference between the steering angle MA and the steering angle MAs (N deviation amount) is performed. The N deviation reduction control is a control to conform the steering angle MA with the steering angle MAs by reducing the size of the difference between the steering angle MA and the steering angle MAs, which is also performed only when the steering operation is performed by a driver. In this case, the rudder angle δf of the front wheels may be presumed on the basis of the steering angle MA and the relative rotation angle θre.

The individual control unit of the electronic control device 16 each comprises a microcomputer having CPU, ROM, RAM, and input/output port device, which are connected with one another via a bidirectional common bus, but may have another structure.

Figure 2:
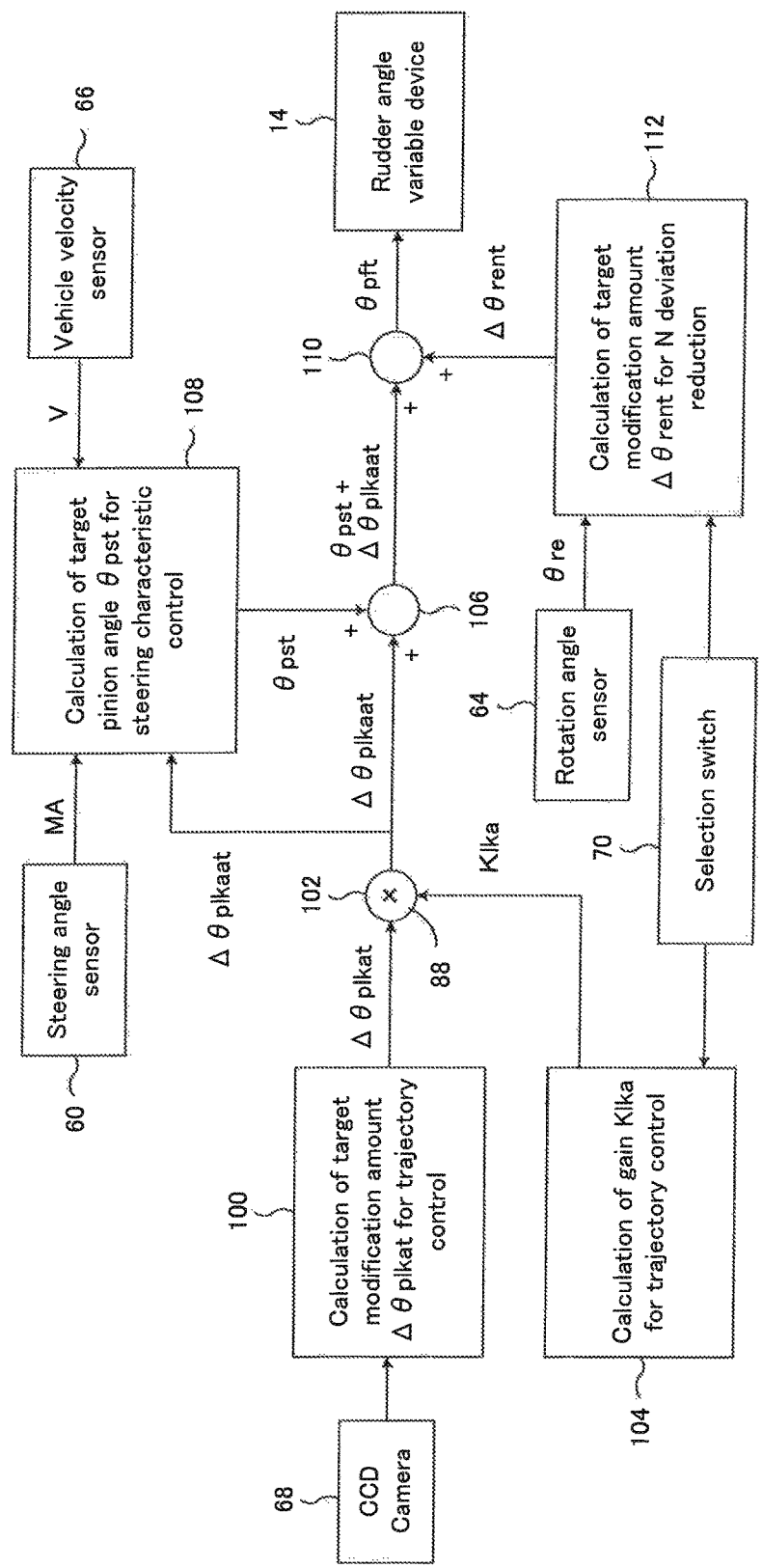
FIG. 2 is a block diagram which conceptually shows steering characteristic control and automatic steering control (trajectory control) performed by a rudder angle control unit of an electronic control device shown in FIG. 1.

FIG. 2 is a block diagram which conceptually shows the steering characteristic control and the automatic steering control for the trajectory control, which are performed by the rudder angle control unit of the electronic control device 16.

As shown in FIG. 2, the signal indicative of image information of the forward view of the vehicle photographed by CCD camera 68 is input to a target modification amount calculation block 100. The block 100 calculates a target modification amount Δθplkat of a pinion angle (rotation angle of the pinion 34 from a position to move a vehicle straight forward) for the trajectory control, namely, a target modification amount of the pinion angle for making a vehicle travel along a travelling road, on the basis of the image information of the forward view of a vehicle, as will be explained in detail later. A signal indicative of the target modification amount Δθplkat is input to a multiplier 102.

To the multiplier 102, a signal indicative of a gain Klka for the trajectory control is also input from a gain calculation block 104. The multiplier 102 outputs to an adder 106 a signal indicative of a modified target modification amount Δθplkaat which is a product Klka·Δθplkat of the gain Klka and the target modification amount Δθplkat. The gain calculation block 104 sets the gain Klka to 1 when the selection switch 70 is on. When the selection switch 70 is switched from on to off, the gain calculation block 104 reduces the gain Klka by degrees from 1 to 0 according to a decrease of the N deviation amount due to the N deviation reduction control, as will be explained in detail later.

The signal indicative of the modified target modification amount Δθplkaat is input also to a target pinion angle calculation block 108. To the block 108, the signal indicative of the steering angle MA detected by the steering angle sensor 60, and the signal indicative of the vehicle velocity V detected by the vehicle velocity sensor 66 are also input. The block 108 calculates a target pinion angle θpst for controlling the steering characteristic to be a desired characteristic according to the vehicle velocity V, on the basis of the modified target modification amount Δθplkaat and the steering angle MA, as will be explained in detail later. The signal indicative of the target pinion angle θpst is input to the adder 106.

The adder 106 outputs to an adder 110 a signal indicative of a sum epst+Δθplkaat of the target pinion angle θpst and the modified target modification amount Δθplkaat. To the adder 110, a signal indicative of a target modification amount Δθrent of the relative rotation angle θre for the N deviation reduction is also input from a target modification amount calculation block 112. When the usual steering control is performed, the block 112 sets the target modification amount Δθrent to 0 when the usual steering operation is being performed, since the N deviation reduction is not necessary. In contrast, when the termination control is performed, Block 112 calculates the target modification amount Δθrent on the basis of the relative rotation angle θre of the lower steering shaft 30 to the upper steering shaft 28 detected by the rotation angle sensor 64.

The adder 110 outputs a signal indicative of a sum θpst+Δθplkaat+Δθrent of the target pinion angle θpst, the modified target modification amount Δθplkaat, and the target relative rotation angle Δθrent, as a final target pinion angle θpft. Then, the rudder angle control unit of the electronic control device 16 controls the rudder angle variable device 14 and the EPS 22, so that the pinion angle becomes the final target pinion angle θpft, to thereby control the rudder angle of the left and right front wheels 18FL and 18FR.

As understood from the above explanation, when the steering mode is the automatic steering mode, the gain Klka is 1, and the target modification amount Δθrent of the relative rotation angle θre is 0. Therefore, the rudder angle variable device 14 and the EPS 22 are controlled with setting the final target pinion angle θpft to be a sum θpst+Δθplkaat of the target pinion angle θpst and the modified target modification amount Δθplkaat. Accordingly, left and right front wheels are controlled to be capable of making a vehicle travel along a travelling road, with achieving the steering characteristic according to the vehicle velocity V.

In contrast, when the steering mode is switched from the automatic steering mode to the manual steering mode, where the N deviation presents and reduction thereof is needed, the N deviation reduction control is performed. In other words, the rudder angle variable device 14 and the EPS 22 are controlled, with setting the final target pinion angle θpft to be a sum θpst+Δθplkaat+Δθrent of the target pinion angle θpst, the modified target modification amount Δθplkaat, and the target modification amount Δθrent. Accordingly, when the trajectory control is terminated, it is possible to lower the N deviation amount by degrees to a predetermined reference value, and to lower the gain Klka for the trajectory control by degrees according to the lowering of the N deviation amount. Therefore, it is possible to reduce the N deviation amount so as not to rapidly change the steering characteristic at the time of termination of the trajectory control.

Figure 3:
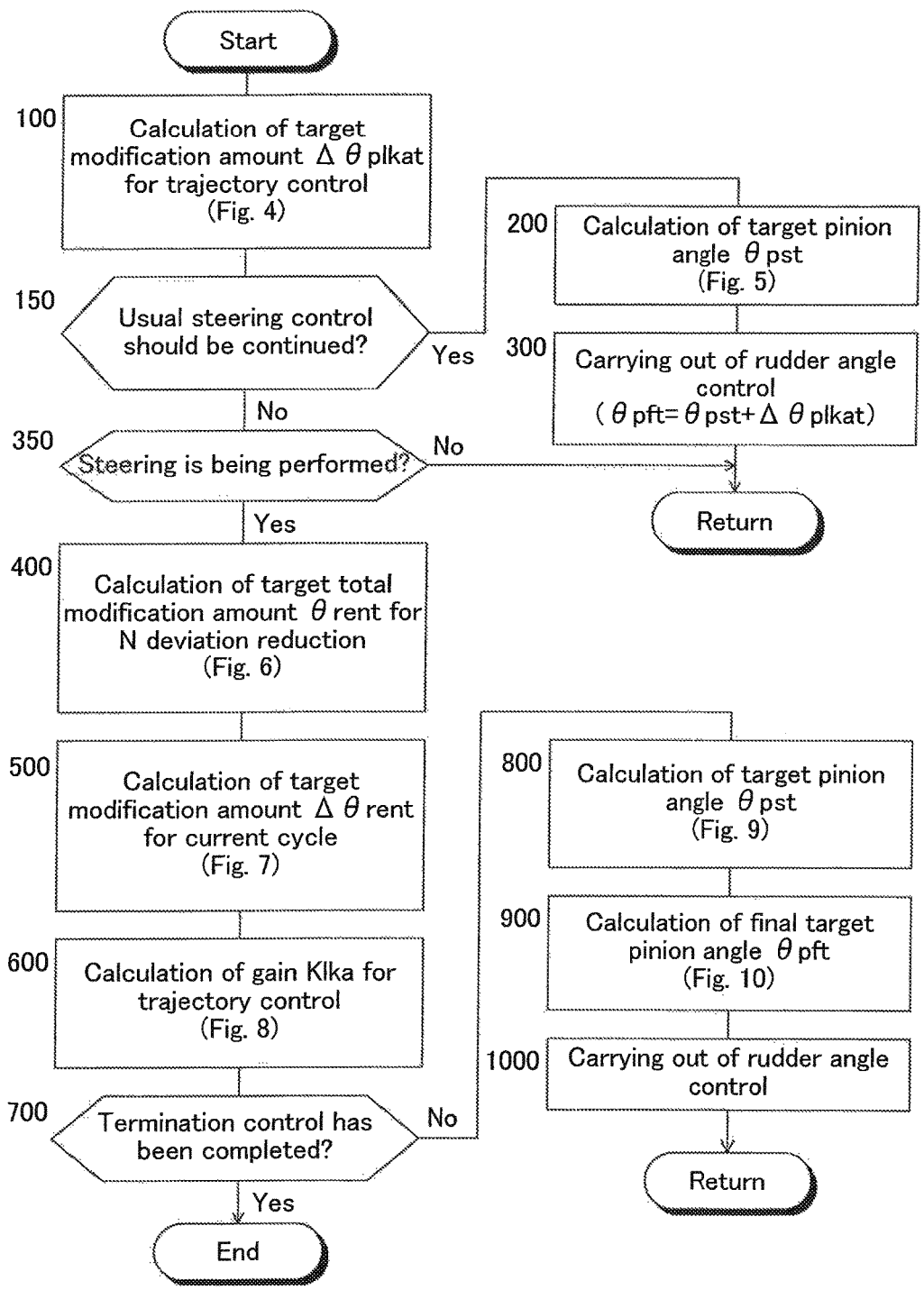
FIG. 3 is a flowchart showing a main routine of steering control consisting of usual steering control and termination control in the first embodiment.

The steering control described above, that is, the steering control conceptually shown in FIG. 2 is specifically carried out according to the flowcharts shown in FIG. 3 through FIG. 10. FIG. 3 is a flowchart showing a main routine of the steering control consisting of the usual steering control and the termination control as the above, and FIG. 4 through FIG. 10 are flowcharts showing sub routines of the steering control.

The steering control according to the flowcharts shown in FIG. 3 through FIG. 10 is initiated when the selection switch 70 is switched from off to on, and repeatedly carried out every predetermined time by the electronic control device 16. The steering control according to the flowcharts shown in FIG. 3 through FIG. 10 is repeatedly carried out every predetermined time, also after the selection switch 70 is switched from on to off, until the gain Klka becomes 0, and the target modification amount Δθrent becomes the reference value. Incidentally, in the following explanation, each control carried out according to the flowcharts shown in FIG. 3 through FIG. 10 will be simply referred to as "control" where necessary.

<Main Routine> (FIG. 3)

In the first place, in advance to step 100, a signal indicative of the steering angle MA detected by the steering angle sensor 60, and the like are read. Step 100 calculates the target modification amount Δθplkat of the pinion angle for the trajectory control, according to the flowchart shown in FIG. 4. This Step 100 corresponds to the target modification amount calculation block 100 shown in FIG. 2.

Step 150 makes a decision of whether or not the usual steering control, namely, the steering characteristic control and the trajectory control are necessary to be continued, for example, on the basis of a decision of whether or not the selection switch 70 is on. Then, when a negative decision is made, the control goes forward to Step 350, and when a positive decision is made, the control goes forward to Step 200. Thus, when it is necessary to continue the usual steering control, Steps 100, 200, and 300 are repeatedly carried out to perform the usual steering control. In contrast, when it is necessary to perform the termination control by switching the selection switch 70 from on to off, Steps 100 and 350 through 1000 are repeatedly carried out to perform the termination control.

Figure 5:
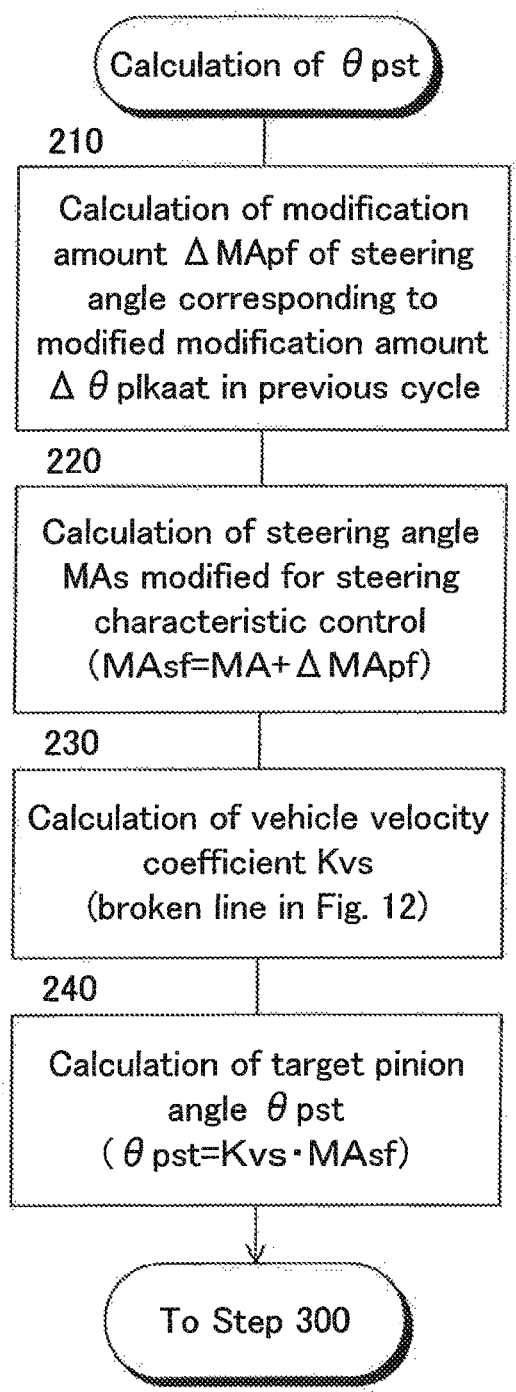
FIG. 5 is a flowchart showing a sub routine to calculate a target pinion angle $\theta$pst for the steering characteristic control.

Step 200 calculates the target pinion angle θpst to control the steering characteristic to be a desired characteristic, according to the vehicle velocity V, according to the flowchart shown in FIG. 5. This Step 200 corresponds to the target pinion angle calculation block 108 shown in FIG. 2.

Step 300 sets the final target pinion angle θpft in the usual steering control to be a sum θpst+Δθplkat of the target pinion angle θpst calculated in Step 200 and the target modification amount Δθplkat of the pinion angle calculated in Step 100. This setting control corresponds to the adder 110 shown in FIG. 2. Then, the rudder angle variable device 14 and the EPS 22 are controlled so that a pinion angle θp becomes the final target pinion angle θpft. Accordingly, a control of the steering characteristic according to the vehicle velocity V is carried out, and the rudder angle of the front wheels is controlled so that the trajectory control to make a vehicle travel along a travelling road is carried out.

Step 350 makes a decision of whether or not the steering operation is performed by a driver, for example, on the basis of a decision of whether or not an absolute value of a difference AMA between the previous steering angle MAf and the current steering angle MA is equal to or more than a reference value ΔMAc (positive fixed number) for a steering operation decision. Then, when a negative decision is made, the control goes back to Step 100 without the termination control being performed, and when a positive decision is made, the control goes forward to Step 400. Incidentally, the decision of whether or not the steering operation is performed by a driver may also be made on the basis of a decision of whether or not a magnitude of steering operation velocity is equal to or higher than the predetermined reference value.

Figure 6:
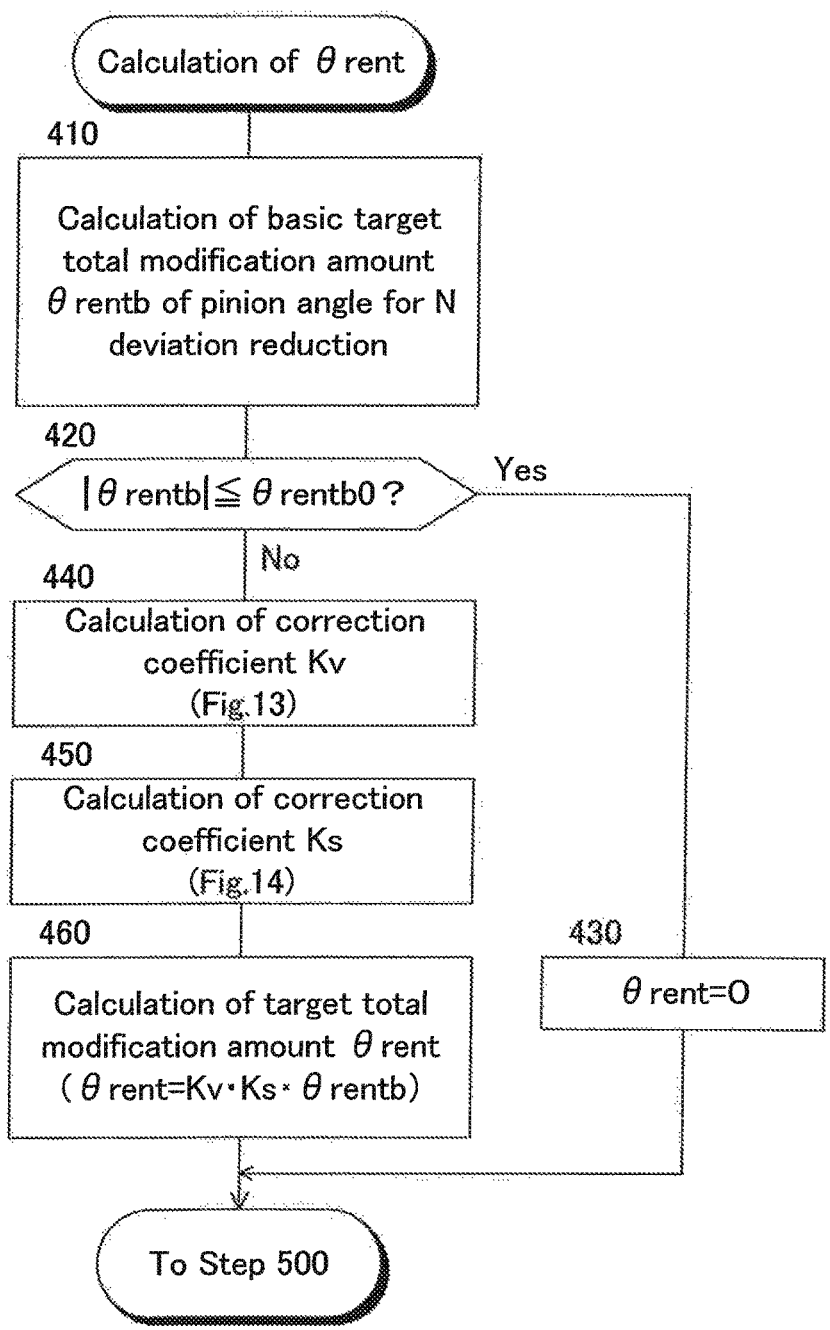
FIG. 6 is a flowchart showing a sub routine to calculate a target total modification amount Brent of an N deviation reduction.

Step 400 calculates a target total modification amount Brent of the relative rotation angle θre for the N deviation reduction, according to the flowchart shown in FIG. 6. The subsequent Step 500 calculates the target modification amount Δθrent of the relative rotation angle θre for the current cycle for the N deviation reduction on the basis of the target total modification amount Brent, according to the flowchart shown in FIG. 7. These Steps 400 and 500 correspond to the target modification amount calculation block 112 of the relative rotation angle, shown in FIG. 2.

Figure 8:
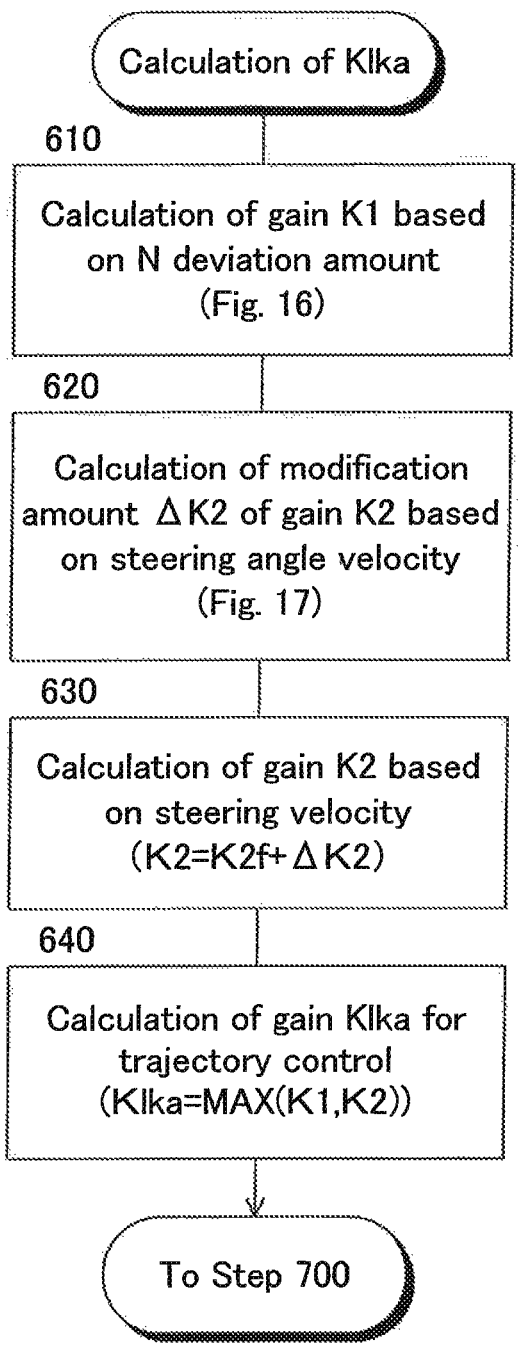
FIG. 8 is a flowchart showing a sub routine to calculate a gain Klka for the trajectory control in the first embodiment.

Step 600 calculates the gain Klka for the trajectory control, according to the flowchart shown in FIG. 8. This Step 600 corresponds to the gain calculation block 104 shown in FIG. 2.

Step 700 makes a decision of whether or not the termination control has been completed, for example, on the basis of a decision of whether or not the gain Klka for the trajectory control is 0. Then, when a positive decision is made, the control according to the flowchart shown in FIG. 3 is terminated, and thus, the steering mode transitions to the manual mode, and when a negative decision is made, the control goes forward to Step 800.

Step 800 calculates the target pinion angle θpst for controlling the steering characteristic to be a desired characteristic according to the vehicle velocity V, as in Step 200 described above, according to the flowchart shown in FIG. 9. This Step 800 also corresponds to the pinion angle calculation block 108 shown in FIG. 2.

Figure 10:
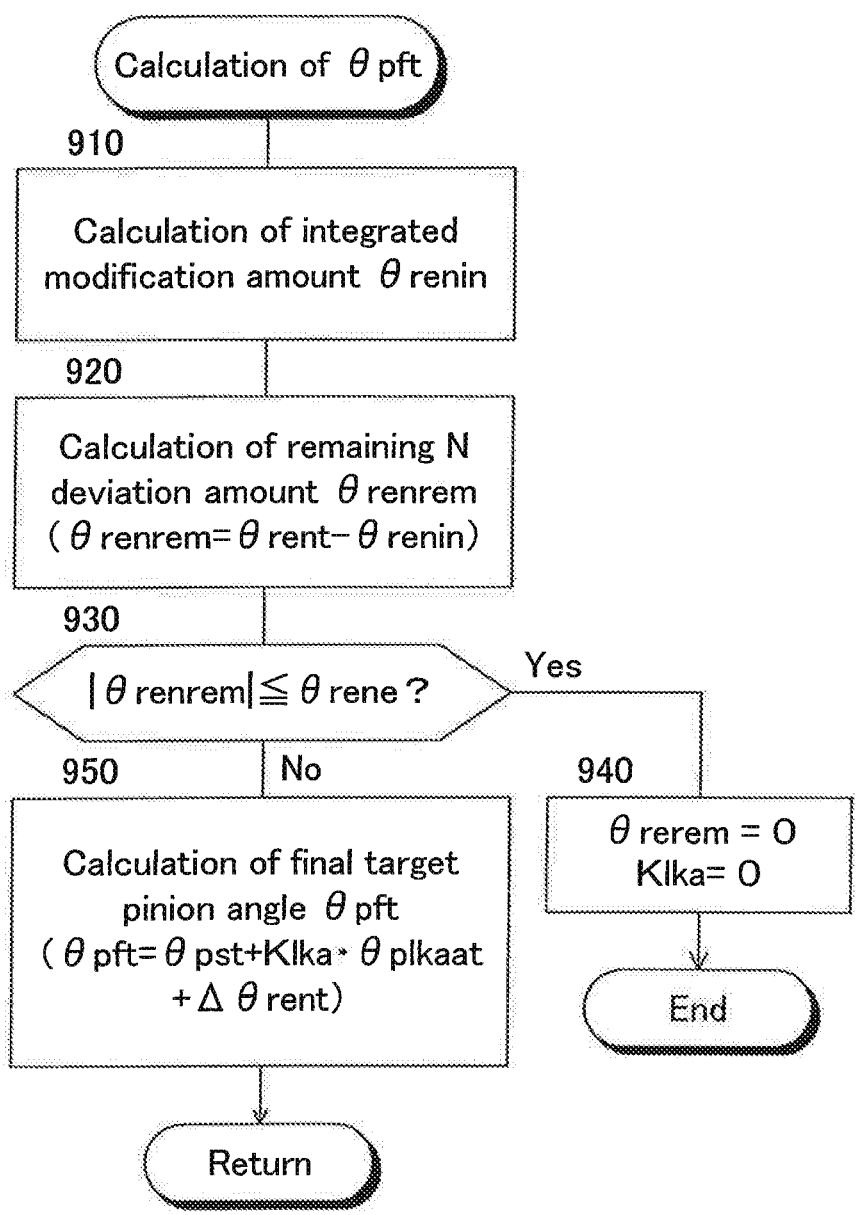
FIG. 10 is a flowchart showing a sub routine to calculate a final target pinion angle $\theta$pft.

Step 900 calculates the final target pinion angle θpft in the termination control, according to the flowchart shown in FIG. 10. This Step 900 corresponds to the adder 110 shown in FIG. 2. Incidentally, the final target pinion angle θpft is a sum θpst+Klka·Δθplka+Δθrent of: the target pinion angle θpst calculated in Step 800; a product of the gain Klka for the trajectory control and the target modification amount Δθplka of the pinion angle; and the target modification amount Δθrent of the relative rotation angle θre.

Step 1000 controls the rudder angle variable device 14 and the EPS 22 so that the pinion angle θp becomes the final target pinion angle θpft.

In the next place, a routine for calculating the target modification amount Δθplkat for the trajectory control described above, etc. are explained in detail, by referring FIG. 4 through FIG. 10.

Figure 4:
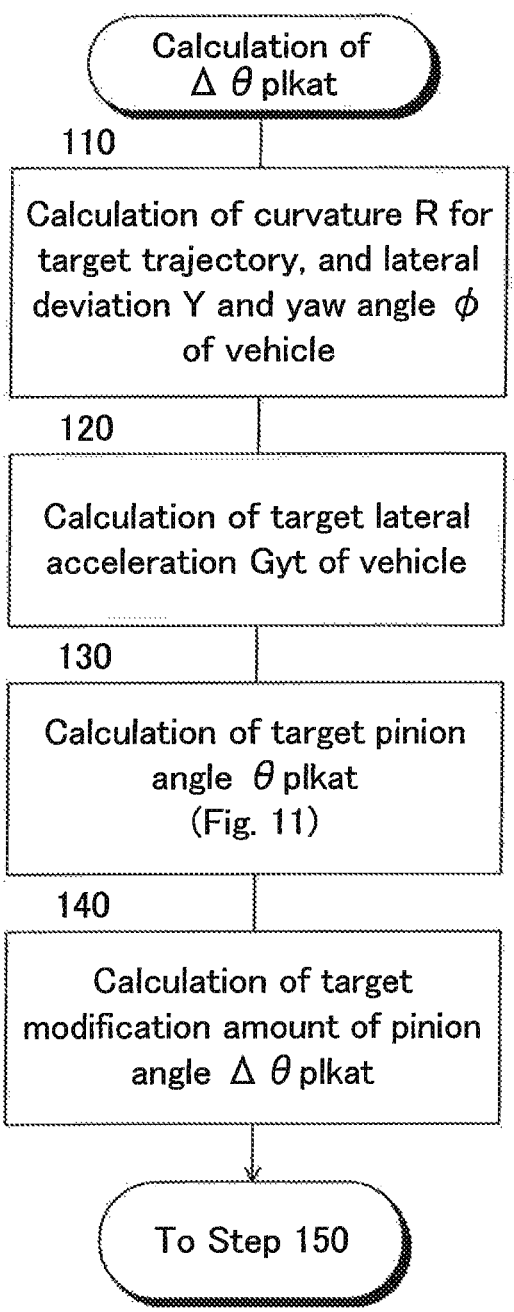
FIG. 4 is a flowchart showing a sub routine to calculate a target modification amount $\Delta\theta$plkat of the trajectory control.

<Routine for Calculating Target Modification Amount Δθplkat for Trajectory Control> (FIG. 4)

In the first place, Step 110 determines a target trajectory of a vehicle along a travelling road on the basis of an analysis of image information of a forward view of a vehicle which is photographed by the CCD camera 68. Subsequently, a curvature R (an inverse of a radius) of the target trajectory, a deviation Y of the vehicle from the target trajectory in lateral direction, and a yaw angle φ are calculated.

Incidentally, the determination of a target trajectory of a vehicle may also be made on the basis of information from a navigation device which is not shown in the figures, or may also be made on the basis of a combination of the analysis of the image information and the information of the navigation device. The curvature R, etc. of the target trajectory are parameters which are necessary in performing the trajectory control to make a vehicle travel along the target trajectory. Since the calculation manner therefor does not constitute the gist of the present invention, the parameters may be calculated in any manner.

Step 120 calculates a target lateral acceleration Gyt as a target turning state amount of the vehicle which is necessary in making the vehicle travel along the target trajectory, on the basis of the above parameters for the trajectory control (R, Y, and φ). The target lateral acceleration Gyt may be calculated by a function of the above parameters for the trajectory control. It is also possible to provide a map which shows a relationship between the above parameters for the trajectory control and the target lateral acceleration Gyt, and to calculate the target lateral acceleration Gyt from the map, on the basis of the above parameters for the trajectory control.

Figure 11:
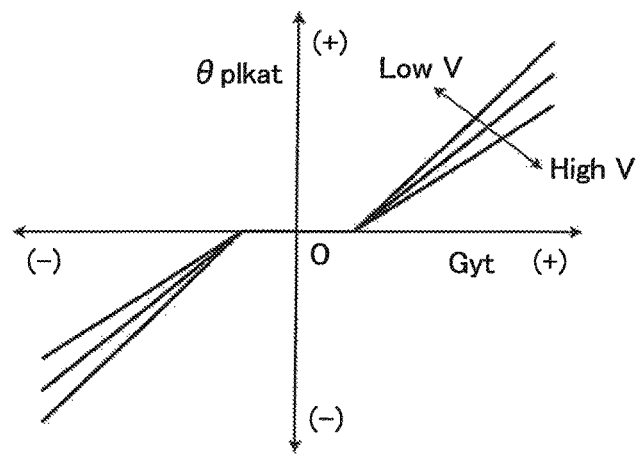
FIG. 11 is a map to calculate a target pinion angle $\theta$lkat of the trajectory control on the basis of a target lateral acceleration Gyt and a vehicle velocity V.

Step 130 calculates a target pinion angle θplkat for the trajectory control from the map shown in FIG. 11, on the basis of the target lateral acceleration Gyt of the vehicle and the vehicle velocity V.

Step 140 presumes the current pinion angle θp on the basis of the steering angle MA and the relative rotation angle θre, and calculates a difference between the target pinion angle θplkat and the current pinion angle θp as the target modification amount Δθplkat of the pinion angle.

<Routine for Calculating Target Pinion Angle θpst for Steering Characteristic Control> (FIG. 5)

In the first place, Step 210 calculates a modification amount ΔMApf for steering angle corresponding to the previous value Δθplkaatf, on the basis of a previous value Δθplkaatf of the modified target modification amount Δθplkaat and a previous value θref of the relative rotation angle θre detected by the rotation angle sensor 64.

Step 220 calculates a value MA−ΔMApf obtained by subtracting the modification amount ΔMApf of the steering angle from the current steering angle MA, as a steering angle MAsf which has been modified for the steering characteristic control. The modified steering angle MAsf is calculated so that the target pinion angle θpst for the steering characteristic control is calculated on the basis of a steering angle which includes a consideration that the rudder angle of the front wheels will be modified by the trajectory control.

Figure 12:
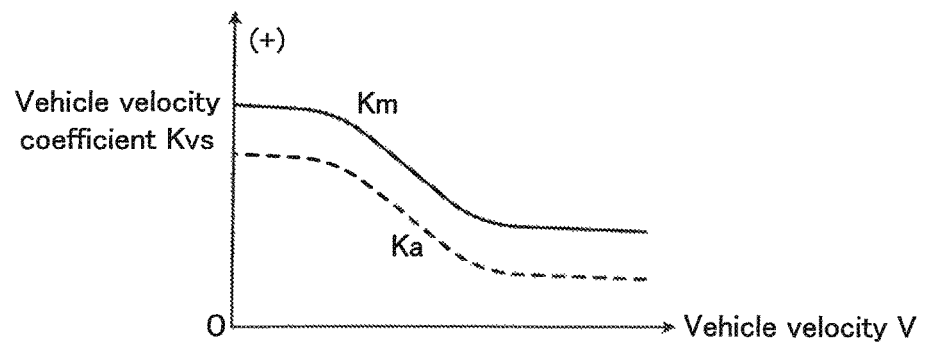
FIG. 12 is a map to calculate a vehicle velocity coefficient Kvs on the basis of the vehicle velocity V.

Step 230 calculates a vehicle velocity coefficient Kvs which is represented by a broken line on the map shown in FIG. 12, on the basis of the vehicle velocity V. In FIG. 12, the broken line represents a vehicle velocity coefficient when the steering mode is the automatic steering mode. The solid line represents a vehicle velocity coefficient when the steering mode is the manual steering mode, which is used in Step 830 described later. As shown in FIG. 12, the vehicle velocity coefficient Kvs is calculated so as to be a positive value which is the smaller, the higher the vehicle velocity V is, in both steering modes.

Step 240 calculates a product Kvs·MAsf of the vehicle velocity coefficient Kvs and the modified steering angle MAsf, as the target pinion angle θpst for controlling the steering characteristic to be a desired characteristic according to the vehicle velocity V.

<Routine for Calculating Target Total Modification Amount θrent for N Deviation Reduction> (FIG. 6)

In the first place, Step 410 sets a sign-reversed value (−θre) of the relative rotation angle θre of the rudder angle variable device 14 detected by the rotation angle sensor 64, as a basic target total modification amount θrentb for the reduction of the N deviation. This basic target total modification amount θrentb is equal to a deviation between the steering angle MA detected by the steering angle sensor 60 and the steering angle MAs found from the rudder angle δf of the left and right front wheels 18FL and 18FR.

Step 420 makes a decision of whether or not an absolute value of the basic target total modification amount θrentb is equal to or less than a reference value θrentb0 (positive fixed number), namely, whether or not the modification of the N deviation can be omitted. Then, when a negative decision is made, the control goes forward to Step 440, and when a positive decision is made, the target total modification amount θrent is set to 0 in Step 430.

Figure 13:
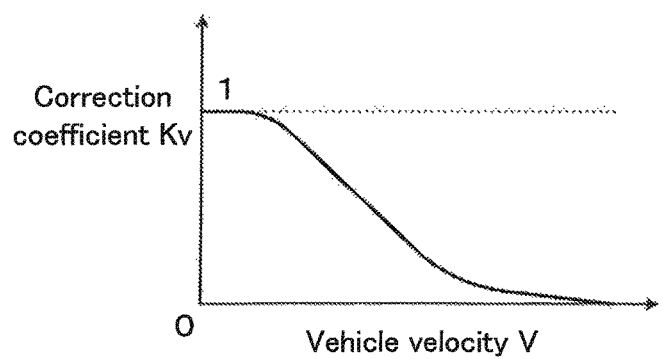
FIG. 13 is a map to calculate a correction coefficient Kv to a basic target total modification amount $\theta$retb on the basis of the vehicle velocity V.

Step 440 calculates a correction coefficient Kv to the basic target total modification amount θretb, from the map shown in FIG. 13, on the basis of the vehicle velocity V. As shown in FIG. 13, the correction coefficient Kv is calculated to be 1 in the extremely low velocity range, and to become a value equal to or more than 0 which becomes by degrees the smaller, the higher the vehicle velocity V is.

Figure 14:
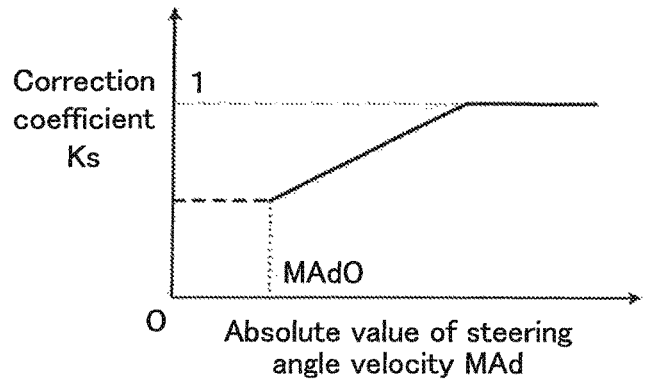
FIG. 14 is a map to calculate a correction coefficient Ks to the basic target total modification amount $\theta$retb on the basis of an absolute value of a steering angle velocity MAd and the vehicle velocity V.

Step 450 calculates a correction coefficient Ks to the basic target total modification amount θretb from the map shown in FIG. 14, on the basis of an absolute value of a steering angle velocity MAd (a time differential value MAd of the steering angle MA) and the vehicle velocity V. As shown in FIG. 14, the correction coefficient Ks is calculated to be 1 in the range where an absolute value of the steering angle velocity MAd is large, and to become a positive value which becomes by degrees the smaller, the smaller an absolute value of the steering angle velocity MAd is.

Step 460 calculates a value which is a product of the basic target total modification amount θrentb and the correction coefficients Kv and Ks according to the Formula (1) below, as the target total modification amount θrent of the pinion angle θp for reducing the N deviation.

$$\theta rent = Kv \cdot Ks \cdot \theta rentb \quad (1)$$

Figure 7:
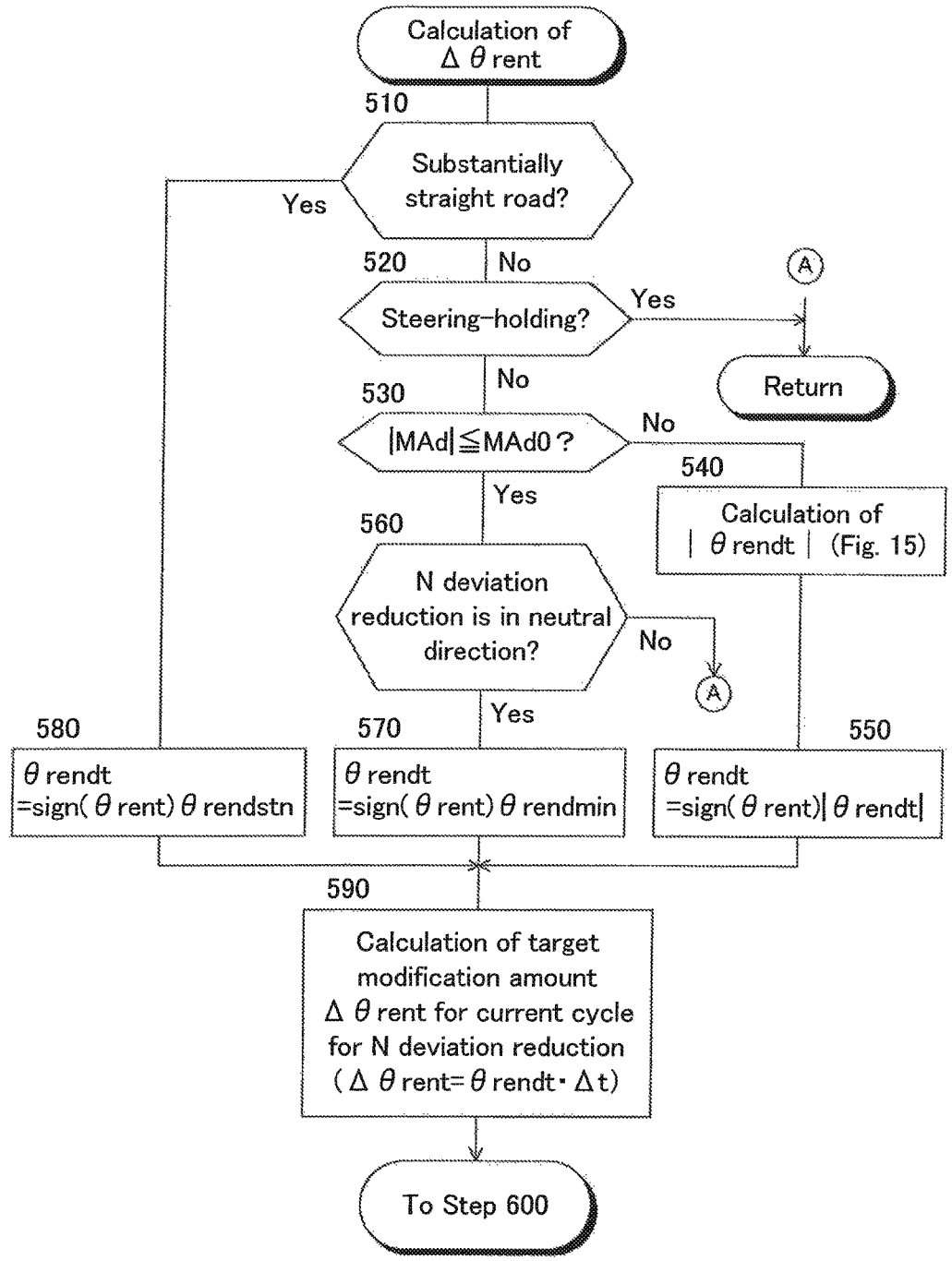
FIG. 7 is a flowchart showing a sub routine to calculate a target modification amount $\Delta\theta$rent of a current cycle of the N deviation reduction.

<Routine for Calculating Target Modification Amount Δθrent for Current Cycle> (FIG. 7)

In the first place, Step 510 makes a decision of whether or not the travelling road ahead of the vehicle is substantially a straight road, on the basis of a decision of whether or not an absolute value of the curvature R of the target trajectory presumed in Step 110 is equal to or less than a reference value RO (positive fixed number) for a Straight road decision. Then, when a positive decision is made, the control goes forward to Step 580, and when a negative decision is made, the control goes forward to Step 520.

Step 520 calculates the steering angle velocity MAd as a value which represents a steering velocity, and makes a decision of whether or not a driver is holding the steering, for example, on the basis of a decision of whether or not an absolute value of the steering angle velocity MAd is equal to or less than a reference value MAdc (a positive fixed number) for a steering-holding decision. Then, when a positive decision is made, the control goes back to Step 100, and when a negative decision is made, the control goes forward to Step 530. Incidentally, this Step 520 may be omitted, since Step 350 in FIG. 3 makes the decision of whether or not the steering is being held.

Step 530 makes a decision of whether or not an absolute value of the steering angle velocity MAd is equal to or less than a reference value MAd0 of a modification inhibitory decision (positive fixed number larger than MAdc), in other words, makes a decision of whether or not the N deviation reduction should be inhibited. Then, when a positive decision is made, the control goes forward to Step 560, and when a negative decision is made, the control goes forward to Step 540.

Figure 15:
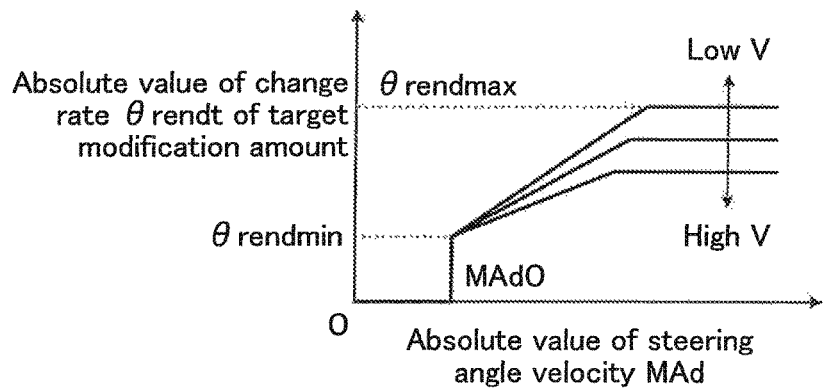
FIG. 15 is a map to calculate an absolute value of a change rate $\theta$ rendt of the target modification amount for reducing the N deviation, on the basis of an absolute value of the steering angle velocity MAd and the vehicle velocity V.

Step 540 calculates an absolute value of a change rate θrendt of the target modification amount for reducing the N deviation, from the map shown in FIG. 15, on the basis of an absolute value of the steering angle velocity MAd and the vehicle velocity V, and after that, the control goes forward to Step 550. As shown in FIG. 15, an absolute value of the change rate θrendt of the target modification amount is calculated so as to be the smaller, the smaller an absolute value of the steering angle velocity MAd is, and so as to be the smaller, the higher the vehicle velocity V is.

Step 550 calculates a product of a sign of target total modification amount sign (Brent) and an absolute value of the change rate θrendt of the target modification amount, as the change rate θrendt of target modification amount for the pinion angle θp for reducing the N deviation.

Step 560 makes a decision of whether or not the N deviation reduction is a modification of the rudder angle to steer the front wheels closer to the straight forward position of the vehicle, in other words, a decision of whether or not it is a modification of the rudder angle to reduce an absolute value of the steering angle MAs found from the rudder angle δf of the front wheels. Then, as a negative decision is made, the control goes back to Step 100, and when a positive decision is made, the control goes forward to Step 570.

Step 570 calculates a product sign (θrent)·θrendmin of a sign (θrent) and a minimum value θrendmin (a positive fixed number), as the change rate θrendt of the target modification amount for the pinion angle θp for reducing the N deviation.

Step 580 calculates a product sign (θrent)·θrendstn of a sign (θrent) and a standard value θrendstn, as the change rate θrendt of the target modification amount for the pinion angle θp for reducing the N deviation. In this case, the standard value θrendstn may be a value larger than the minimum value θrendmin and smaller than a maximum value θrendmax (see FIG. 15), or equal to the maximum value θrendmax.

Step 590 calculates a product θrendt·Δt of the change rate θrendt and a cycle time Δt in the flowchart shown in FIG. 3, as the target modification amount Δθrent for the current cycle for reducing the N deviation.

<Routine for Calculating Gain Klka of Trajectory Control> (FIG. 8)

Figure 16:
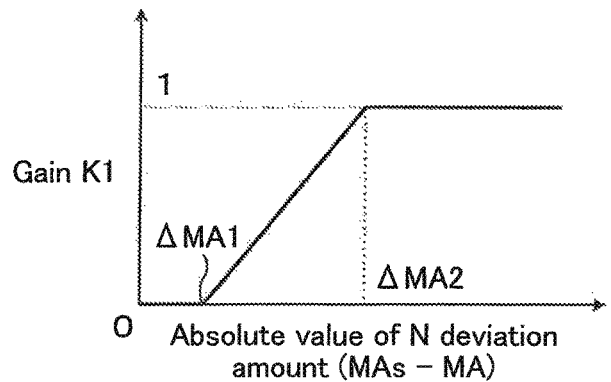
FIG. 16 is a map to calculate a first gain K1 on the basis of an absolute value of the N deviation amount.

In the first place, Step 610 calculates a first gain K1 for calculating the gain Klka for the trajectory control, from the map shown in FIG. 16, on the basis of an absolute value of the N deviation amount (Mas−MA=θre). As shown in FIG. 16, the first gain K1 is calculated to be 0 when an absolute value of the N deviation amount is equal to or less than ΔMA1 (a positive fixed number), and calculated to be 1 when an absolute value of the N deviation amount is equal to or more than ΔMA2 (a positive fixed number larger than ΔMA1). When an absolute value of the N deviation amount is a value larger than ΔMA1 and smaller than ΔMA2, the first gain K1 is calculated to be a value between 0 and 1 which becomes the smaller, the smaller an absolute value of the N deviation amount is.

Figure 17:
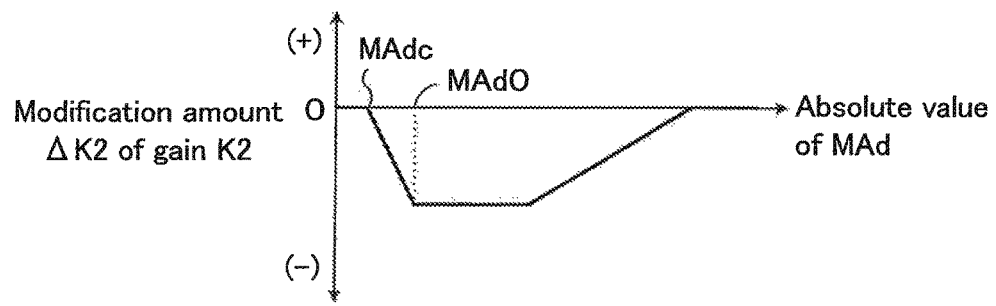
FIG. 17 is a map to calculate a modification amount $\Delta$K2 of a second gain K2 on the basis of an absolute value of the steering angle velocity MAd.

Step 620 calculates a modification amount ΔK2 for a second gain K2 for calculating the gain Klka for the trajectory control from the map shown in FIG. 17, on the basis of an absolute value of the steering angle velocity MAd. As shown in FIG. 17, the modification amount ΔK2 for the second gain K2 is calculated to be 0 in the range where an absolute value of the steering angle velocity MAd is very small, and to be a negative value outside the range where an absolute value of the steering angle velocity MAd is very small. Furthermore, the modification amount ΔK2 is basically calculated to become smaller in size, as an absolute value of steering angle velocity MAd becomes larger.

Step 630 calculates a sum of a previous value K2f of the second gain K2 and the modification amount ΔK2, as the second gain K2 for calculating the gain Klka for the trajectory control. In this case, the previous value K2f is set to be 1 at a time of initiation of the usual steering control or at a time of initiation of the termination control. The control routine of FIG. 8 is repeatedly carried out, only when the steering operation is performed by a driver. Therefore, the second gain K2 is decreased according to an integrated value of time, during which the steering operation is performed by a driver, and a reduction velocity during the time is a value which corresponds to ΔK2.

Step 640 calculates the gain Klka for the trajectory control to be a larger value of the first gain K1 and the second gain K2.

Figure 9:
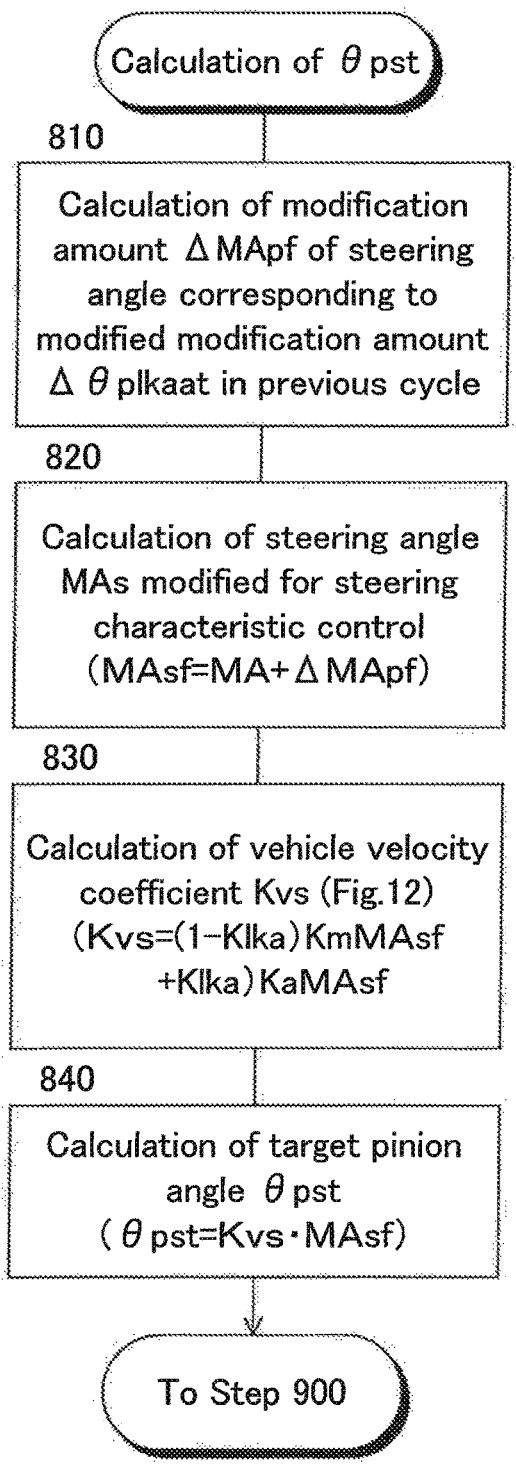
FIG. 9 is a flowchart showing a sub routine to calculate the target pinion angle $\theta$pst for the steering characteristic control.

<Routine for Calculating Target Pinion Angle θpst for Steering Characteristic Control> (FIG. 9)

In the first place, Steps 810 and 820 are carried out as in the Steps 210 and 220 (FIG. 5) described above respectively, to thereby calculate the steering angle MAsf which has been modified for the steering characteristic control.

Step 830 calculates a vehicle velocity coefficient Ka when the steering mode is the automatic steering mode, and a vehicle velocity coefficient Km when the steering mode is the manual steering mode, from the map shown in FIG. 12, on the basis of the vehicle velocity V. Then, according to the following the Formula (2), the vehicle velocity coefficient Kvs is calculated as a weighted sum of the vehicle velocity coefficients Ka and Km, based on the gain Klka.

$$Kvs=(1-Klka)\cdot Km\cdot MAsf+Klka\cdot Ka\cdot MAsf \quad (2)$$

Step 840 calculates a product Kvs·MAsf of the vehicle velocity coefficient Kvs and the modified steering angle MAsf, as the target pinion angle θpst for controlling the steering characteristic to be a desired characteristic according to the vehicle velocity V.

<Routine for Calculating Final Target Pinion Angle θpft> (FIG. 10)

In the first place, Step 910 calculates an integrated modification amount θrenin of the N deviation, that is, a total sum of the amount of the N deviation reduction due to the rudder angle control carried out in Step 1000 in each cycle after the termination control is initiated.

Step 920 calculates a remaining N deviation amount θrenrem, that is, the N deviation amount which still needs to be reduced, according to the Formula (3) below.

$$\theta renrem=\theta rent-\theta renin \quad (3)$$

Step 930 makes a decision of whether or not an absolute value of the remaining N deviation amount θrenrem is equal to or less than a reference value for a termination decision θrene (positive fixed number close to 0) of the N deviation reduction, in other words, a decision of whether or not the N deviation reduction may be terminated. Then, when a negative decision is made, the control goes forward to Step 950, and when a positive decision is made, the remaining N deviation amount θrenrem and the gain Klka for the trajectory control are set to 0 in Step 940, and after that, the control which has been performed according to the flowcharts shown in FIG. 3 through FIG. 10 is terminated, and a steering control of the manual steering mode is initiated.

Step 950 calculates a sum θpst+Klka·Δθplkat+Δθrent of the target pinion angle θpst calculated in Step 800, a product of the gain Klka for the trajectory control and the target modification amount of pinion angle Δθplka (the modified target modification amount Δθplkaaat), and the target modification amount Δθrent of the relative rotation angle θre, as the final target pinion angle θpft in the termination control.

In the next place, functioning of the above described embodiment will be explained, according to each of cases when the usual steering control is performed, when the termination control is performed with the low steering angle velocity, when the termination control is performed with the high steering angle velocity, and when the termination control is not performed.

<A. Usual Steering Control>

When the selection switch 70 is on, Step 150 makes a positive decision, and accordingly, Steps 100, 200, and 300 are repeatedly carried out to perform the usual steering control, namely, the trajectory control of the vehicle and the control of the steering characteristic according to a vehicle velocity. In other words, Step 100 calculates the target modification amount Δθplkat of the pinion angle for the trajectory control, and Step 200 calculates the target pinion angle θpst for controlling the steering characteristic to be a desired characteristic, according to the vehicle velocity V.

Then, Step 300 sets the final target pinion angle θpft in the usual steering control to be a sum θpst+Δθplka of the target pinion angle θpst and the target modification amount Δθplka of the pinion angle. Then, the rudder angle variable device 14 and the EPS 22 are controlled so that the pinion angle θp becomes the final target pinion angle θpft. Accordingly, the steering characteristic according to the vehicle velocity V is achieved, and the rudder angle of the left and right front wheels is controlled so that the vehicle travels along a travelling road.

<B. Termination Control>

When the selection switch 70 is switched from on to off, Step 150 makes a negative decision, and accordingly, Step 100 and Steps 350 through 1000 are repeatedly carried out to perform the termination control, namely, the control of switching the steering mode and the N deviation reduction control are performed. In other words, Step 100 calculates the target modification amount Δθplkat of the pinion angle for the trajectory control, as in the usual steering control. Then, when the steering operation is performed by a driver, Step 350 makes a positive decision. Accordingly, Step 400 calculates the target total modification amount Brent of the relative rotation angle θre for the N deviation reduction, and Step 500 calculates the target modification amount Δθrent of the relative rotation angle θre of the current cycle for the N deviation reduction.

Step 600 calculates the gain Klka for the trajectory control, so as to become smaller as the N deviation amount is decreased. Then, Steps 800 through 1000 are repeatedly carried out until the size of the remaining N deviation amount θrenrem becomes equal to or less than the reference value θrene, to thereby reduce the N deviation amount by degrees, and reduce control amount of the trajectory control by degrees.

<B-1. Termination Control when Steering Angle Velocity is Low>

When the steering angle velocity is low within a range where the magnitude of the steering angle velocity is larger than MAd0, Step 500 (540, 550, and 590) calculates the size of the target modification amount Δθrent of the relative rotation angle θre of the current cycle for the N deviation reduction to be a relatively small value. Therefore, the reduction of the N deviation is performed relatively slowly to thereby reduce the concern that a driver feels the unusual feeling due to the rudder angle of the front wheels being controlled for the N deviation reduction.

Also, since the reduction of the N deviation is performed relatively slowly, the gain Klka for the trajectory control calculated in Step 600 is also relatively slowly lowered, and accordingly, the control amount of the trajectory control is also relatively slowly lowered. Thus, the concern that a driver feels the unusual feeling due to the change in the control amount of the trajectory control is reduced.

Figure 18:
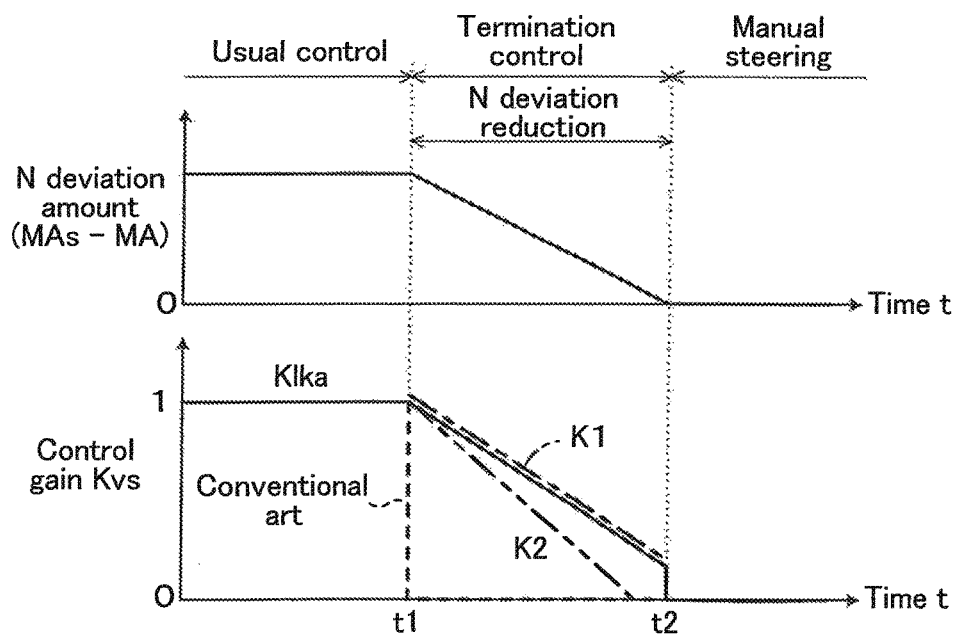
FIG. 18 is a time chart schematically showing an example of a change in the N deviation amount and a gain Klka for the trajectory control when the steering angle velocity is low.

For example, FIG. 18 schematically shows an example of a change in the N deviation amount and the gain Klka for the trajectory control when the steering angle velocity is low. As shown in FIG. 18, it is assumed that the usual steering control is terminated and the termination control is initiated at the time point t1, and the termination control is terminated and the manual steering mode is initiated at time point t2. Incidentally, it is also the same in FIG. 19 which will be described later.

Since an absolute value of the steering angle velocity MAd is small, size of the modification amount ΔK2 of the second gain ΔK2 becomes large, and the second gain K2 is lowered relatively swiftly. However, the N deviation amount is relatively slowly decreased from the time point t1 to time point t2, and as a result, the first gain K1 is relatively mildly decreased. Therefore, as shown in FIG. 18 by a solid line, the gain Klka for the trajectory control is decreased relatively mildly in accordance with the change of the first gain K1.

In a conventional standard steering control device, when the usual steering control is terminated and the termination control is initiated, a gain for the trajectory control is abruptly lowered, and a control amount of the trajectory control abruptly becomes 0, as shown in FIG. 18 by a broken line. In contrast, according to the embodiment, it is possible to mildly reduce the gain Klka for the trajectory control, and to thereby prevent the control amount of the trajectory control from being abruptly decreased.

<B-2. Termination Control when Steering Angle Velocity is High>

When the steering angle velocity is high, Step 500 (540, 550, and 590) calculates the size of the target modification amount Δθrent of the relative rotation angle θre of the current cycle for the N deviation reduction to be a relatively large value. Accordingly, the N deviation reduction is performed relatively swiftly. However, since it is in a condition that the steering operation is performed with a high steering angle velocity, there is low concern that a driver feels the unusual feeling due to the rudder angle of the front wheels being control for the N deviation reduction.

Although the N deviation amount is relatively swiftly reduced, the gain K2 calculated in Step 600 (620, 630) is gradually lowered and the gain Klka for the trajectory control is not lowered abruptly, and accordingly, the control amount of the trajectory control is not lowered abruptly. Thus, the concern that a driver feels the unusual feeling due to the change in the control amount of the trajectory control is reduced.

Figure 19:
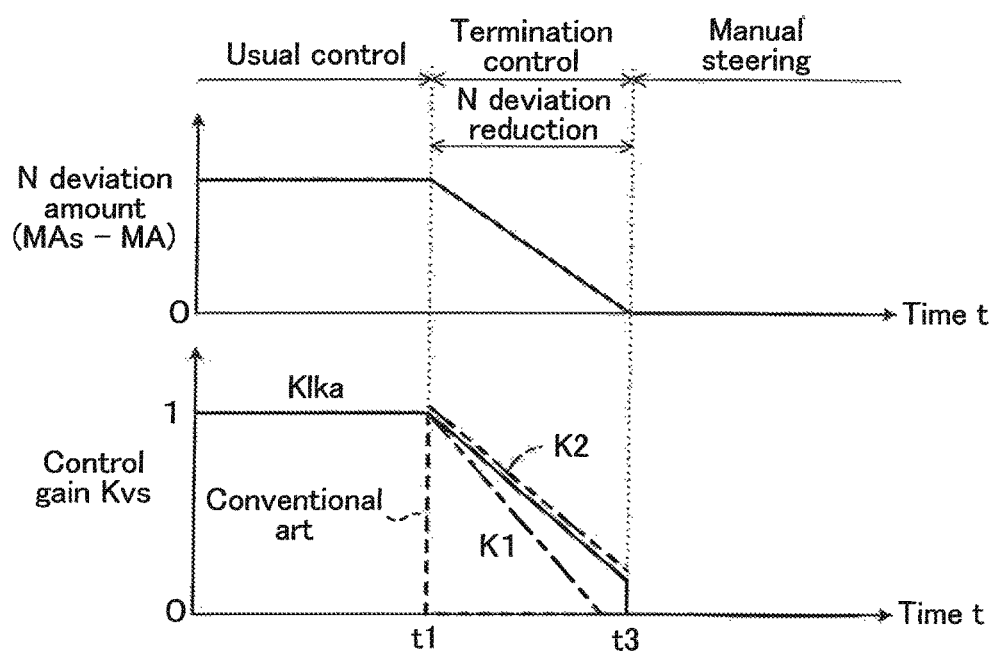
FIG. 19 is a time chart schematically showing an example of a change in the N deviation amount and the gain Klka for the trajectory control when the steering angle velocity is high.

For example, FIG. 19 schematically shows an example of a change in the N deviation amount and the gain Klka for the trajectory control when the steering angle velocity is high.

The N deviation amount is relatively swiftly reduced from the time point t1 to time point t3. Thus, the first gain K1 is relatively swiftly decreased, and the time point t3 is closer to the time point t1 than the time point t2 in FIG. 18 is. However, since an absolute value of the steering angle velocity MAd is large, size of the modification amount ΔK2 of the second gain K2 becomes small, and the second gain K2 is lowered relatively mildly. Therefore, as shown in FIG. 19 by a solid line, the gain Klka for the trajectory control is decreased relatively mildly in accordance with the change of the second gain K2.

Accordingly, as in the case where the steering angle velocity is low, it is possible to mildly reduce the gain Klka for the trajectory control, and to thereby prevent the control amount of the trajectory control and the control amount of the steering characteristic from being abruptly decreased.

<C. When Termination Control is not Performed>

When the steering operation is not performed by a driver even if the selection switch 70 is switched from on to off, namely, in a steering-holding time, Step 350 makes a negative decision. Accordingly, Steps 400 through 1000 are not carried out, and thus, the termination control is not performed. Therefore, when the steering operation is not performed by a driver, the N deviation reduction is not performed, and therefore, it is possible to prevent a driver from feeling the unusual feeling due to the rudder angle of the left and right front wheels being changed in spite that the steering operation is not being performed.

Also, since the N deviation amount is not decreased, the first gain K1 is not decreased as well, and accordingly, the gain Klka for the trajectory control calculated in Step 600 is not lowered. Furthermore, since Step 630 is not carried out, the second gain K2 is not decreased as well. Thus, even if the steering operation is intermittently performed by a driver, the gain Klka is not lowered during non-steering, and therefore, the overriding degree of the manual steering to the automatic steering at a time of resumption of the steering operation is identical to the overriding degree at a time of termination of the previous steering operation. Accordingly, even when an intermittent steering operation is performed by a driver, it is possible to prevent a driver from feeling the unusual feeling due to the overriding degree of the manual steering to the automatic steering being changed at each steering operation.

Incidentally, when the N deviation amount at the time of terminating the usual steering control is small, duration of the termination control also becomes short, and the gain Klka for the trajectory control is swiftly decreased. However, in that case, the modification amount of the rudder angle of the front wheels which is necessary to reduce the N deviation is also small, and therefore, there is low concern that a driver feels the unusual feeling due to the change in the rudder angle of the front wheels for the N deviation reduction, or due to the reduction in the control amount of the trajectory control.

In addition, the reduction of the N deviation is not performed in a circumstance where even if selection switch 70 is switched from on to off, there is the concerned that a driver may feel the unusual feeling due to the rudder angle of the front wheels being controlled for the reduction of the N deviation. Examples for such circumstance include the case of steering-holding (Step 520) and the case where an absolute value of the steering angle velocity MAd is equal to or less than the reference value MAd0 and the N deviation reduction steers the front wheels to a direction away from the straight forward position of the vehicle (Steps 530 and 550).

When the reduction of the N deviation is not performed, the gain Klka for the trajectory control is not decreased. Therefore, even if the selection switch 70 is switched from on to off, the gain Klka for the trajectory control is remained to the current value until the reduction of the N deviation is initiated. Thus, a substantial termination control is initiated when a steering operation to drive the front wheels to a direction approaching to the straight forward position of the vehicle is initiated by a driver.

Second Embodiment

Figure 20:
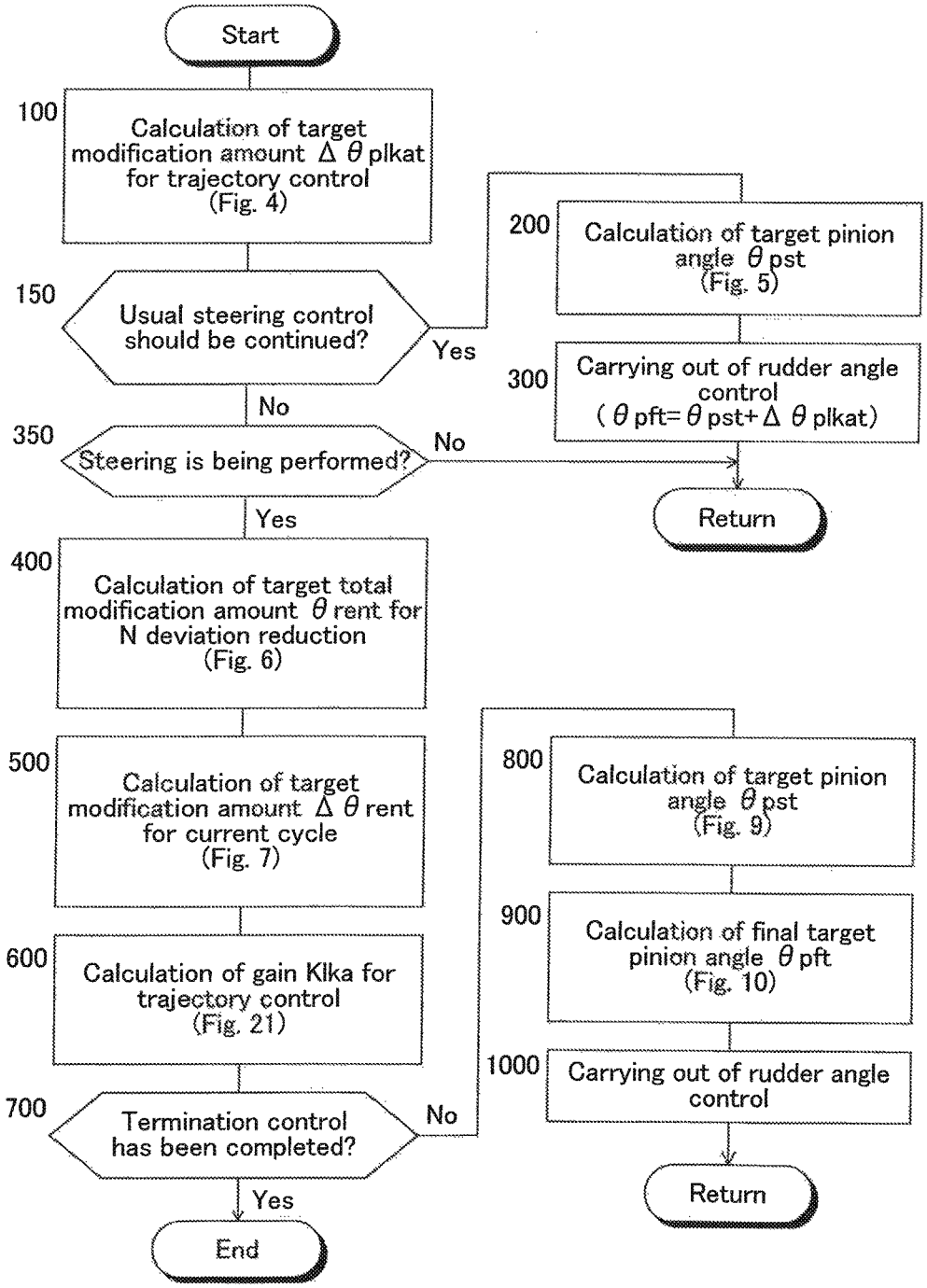
FIG. 20 is a flowchart showing a main routine of the steering control consisting of automatic steering control and termination control in the second embodiment.
Figure 21:
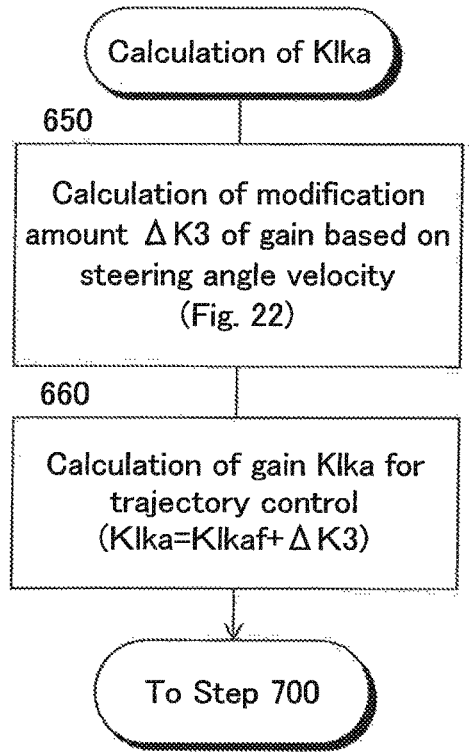
FIG. 21 is a flowchart showing a sub routine to calculate a gain Klka for trajectory control in the second embodiment.

FIG. 20 is a flowchart showing a main routine of the steering control consisting of the automatic steering control and the termination control in the second embodiment, and FIG. 21 is a flowchart showing a sub routine to calculate the gain Klka for the trajectory control in the second embodiment.

In this second embodiment, Step 600 calculates the gain Klka for the trajectory control, according to the flowchart shown in FIG. 21. The other steps of this embodiment are carried out as in the first embodiment described above.

Figure 22:
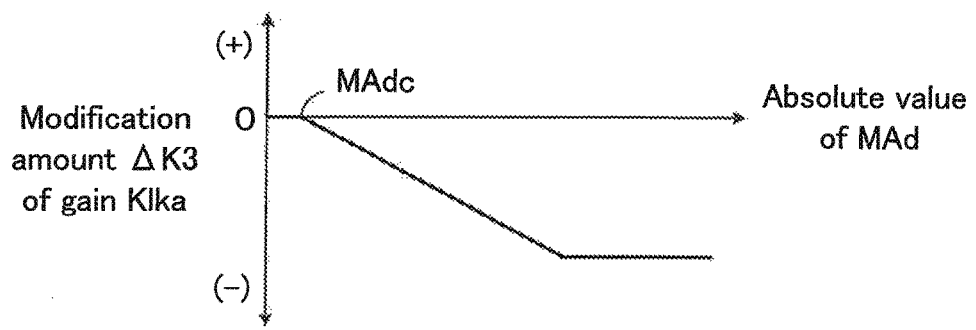
FIG. 22 is a map to calculate a modification amount $\Delta$K3 of the gain Klka on the basis of an absolute value of a steering angle velocity MAd.

As understood from a comparison between FIG. 21 and FIG. 8, the first gain K1 and the second gain K2 are not calculated in this embodiment, but Step 650 calculates a modification amount ΔK3 for calculating the gain Klka for the trajectory control from the map shown in FIG. 22, on the basis of an absolute value of the steering angle velocity MAd. In this case, the modification amount ΔK3 is a negative value, and calculated to become the larger, the larger an absolute value of the steering angle velocity MAd is.

Then, Step 660 calculates the gain Klka for the trajectory control to be a sum of a previous value Klkaf and the modification amount ΔK3, provided that the Klkaf is a previous value of the trajectory control. In this case, the previous value Klkaf is set to be 1 at a time of initiation of the usual steering control or at a time of initiation of the termination control.

According to this embodiment, as far as the steering operation is performed by a driver, the gain Klka for the trajectory control is gradually reduced as time advances, irrespective of change in the N deviation amount. The control amount of the trajectory control is gradually reduced in a condition that the steering operation is performed by a driver, and the control amount of the trajectory control is not lowered in a condition that the steering operation is not performed by a driver. Accordingly, as in the first embodiment, even when an intermittent steering operation is performed by a driver, it is possible to prevent a driver from feeling the unusual feeling due to the overriding degree of the manual steering to the automatic steering being changed at each steering operation.

Also, according to this embodiment, the larger an absolute value of the steering angle velocity MAd is, the higher the lowering velocity of the gain Klka for the trajectory control becomes. Therefore, the higher the steering angle velocity is, due to a driver's strong will to change a course of a vehicle by a steering, the higher the lowering velocity of the gain Klka for the trajectory control may be made, so that the steering mode can be swiftly transitioned from the automatic steering mode to the manual steering mode.

Incidentally, also in this embodiment, the reduction of the N deviation is carried out as in the first embodiment described above, in the condition that the steering operation is performed by a driver. Accordingly, it is possible to reduce the concern that a driver feels the unusual feeling due to the change in the rudder angle of the front wheels for the N deviation reduction.

Hereinabove, the present invention has been described in detail on the specific embodiments. However, the present invention is not limited to the examples described above, and it is obvious for those skilled in the art that various other embodiments can be realized in the scope of the present invention.

For example, in the first embodiment described above, Step 600 calculates the gain Klka for the trajectory control to be a larger value of the first gain K1 and the second gain K2. Particularly, magnitude of the reduction rate of the second gain K2 is calculated to become smaller, as an absolute value of the steering angle velocity MAd becomes larger. Accordingly, the gain Klka for the trajectory control is inhibited by the second gain K2 from becoming smaller as an absolute value of the rudder angle velocity MAd, which is a steering operation velocity, becomes larger.

However, the magnitude of the reduction rate of the gain Klka for the trajectory control may also be limited, for example by setting, in advance, a limit value for the reduction rate (negative value) of the gain Klka for the trajectory control, and limiting the reduction rate of the gain Klka for the trajectory control not to become under the limit value. In that case, the limit value for the reduction rate may be a fixed number, and may also be variably set depending on a size of the N deviation amount at the time of initiation of the termination control, for example, so as to be the larger in magnitude, the smaller the size of the N deviation amount at the time of initiation of the termination control is, to thereby relax the limit of the magnitude of the reduction rate.

Furthermore, in the second embodiment described above, the lowering velocity of the gain Klka for the trajectory control is variably set according to an absolute value of the steering angle velocity MAd, so as to become the higher, the larger an absolute value of the steering angle velocity MAd is. However, the lowering velocity of the gain Klka for the trajectory control may also be invariable irrespective of the steering angle velocity, and may also be variably set according to the vehicle velocity V so as to be the lower, the higher the vehicle velocity is.

In addition, in the first and second embodiments described above, reliability of the trajectory control may be decided, for example, on the basis of a ratio of a distance to a white line on a travelling road photographed and recognized by the CCD camera 68 to a distance to the white line on the travelling road which is necessary for the trajectory control. Then, the gain Klka for the trajectory control may be modified to become the smaller, the lower the reliability of the trajectory control is.

Furthermore, in the first and second embodiments described above, the automatic steering control is configured to be performed to achieve the trajectory control for making a vehicle travel along a target trajectory. However, the automatic steering control may be, for example, a lane deviation preventing control which controls a vehicle not to deviate from a lane, or an optional rudder angle control such as a control which makes a vehicle travel after a preceding vehicle, as far as it is a control which steers the left and right front wheels in the automatic steering mode.

Also, the first and second embodiments described above is also configured to perform the steering control for controlling a steering characteristic of a vehicle according to the vehicle velocity V, in addition to the automatic steering control for the trajectory control. However, the control of the steering characteristic according to the vehicle velocity V may be omitted, and it is also possible to reduce by degrees a control amount of the steering characteristic according to the vehicle velocity V, together with a control amount of the trajectory control, at the time of termination of the usual steering control. It is also possible to configure so that the control of the steering characteristic according to the vehicle velocity V is not performed in the manual steering mode.

Also, in the first and second embodiments described above, the N deviation reduction is configured to be performed in the same manner as described in international patent application PCT/JP2012/078991 which is an application of the present applicant. However, the N deviation reduction may be performed in any manner, and preferably performed so that a reduction amount of the N deviation per unit time becomes the larger, the higher the steering operation velocity is, as described in Japanese Patent Application Laid-Open No. 2006-96187.

Also, in the first and second embodiments described above, the N deviation amount is calculated as a deviation between the steering angle MAs found from the rudder angle δf of the front wheels and the steering angle MA detected by the steering angle sensor 60. However, the N deviation amount may also be calculated as a deviation between the pinion angle found from the rudder angle δf of the front wheels and the pinion angle found from the steering angle MA, or may also be calculated as a deviation between the rudder angle δf of the front wheels and the rudder angle of the front wheels found from the steering angle MA.

Also, in the first and second embodiments described above, the target lateral acceleration Gyt is calculated as the target turning state amount (the target turning state amount for the automatic steering) of a vehicle which is necessary to make the vehicle travel along a target trajectory; and the target modification amount Δθplkat of the pinion angle for the trajectory control is calculated on the basis of the target lateral acceleration Gyt. However, it is also possible that a target yaw rate γt of the vehicle is calculated as the target turning state amount of the vehicle which is necessary to make the vehicle travel along a target trajectory, and the target modification amount Δθplkat is calculated on the basis of the target yaw rate γt.

Also, in the first and second embodiments described above, the left and right front wheels, which are steered wheels, are configured to be steered by the EPS 22 and the rudder angle variable device 14 which rotates the lower steering shaft 30 relatively to the upper steering shaft 28. However, the rudder angle variable device which steers the steered wheels may also be a by-wire type steering device and an EPS.

The invention claimed is:

1. A vehicular steering control device comprising a rudder angle variable device which varies a rudder angle of a steered wheel, and a rudder angle control device which controls said rudder angle variable device, wherein a steering mode is switched between a manual steering mode which controls the rudder angle of the steered wheel according to an operating position of a steering input device which is operated by a driver, and an automatic steering mode which calculates a target rudder angle of said steered wheel and controls said rudder angle of the steered wheel to be said target rudder angle by said rudder angle variable device, characterized in that, when said steering mode is switched from said automatic steering mode to said manual steering mode, said rudder angle control device gradually reduces a control gain, only when said operating position of the steering input device is changed by a driver, provided that said control gain of said automatic steering mode is a ratio of an actual modification amount of the rudder angle to a target modification amount of the rudder angle of said steered wheel for making said rudder angle of the steered wheel become said target rudder angle.

2. The vehicular steering control device according to claim 1, characterized in that:

said rudder angle variable device is capable of altering a relationship between said operating position of the steering input device and an operating position of said steering input device found from the rudder angle of the steered wheel;

said rudder angle control device reduces a size of a deviation between said two operating positions by degrees, only when said operating position of the steering input device is changed by a driver, when said steering mode is switched from said automatic steering mode to said manual steering mode; and said rudder angle control device gradually reduces said control gain only when said operating position of the steering input device is changed by a driver, by controlling said control gain according to said size of the deviation between the two operating positions, so that said control gain becomes smaller as said size of the deviation between the two operating positions becomes smaller.

3. The vehicular steering control device according to claim 2, characterized in that said rudder angle control device makes a velocity of reducing said size of the deviation between the two operating positions the higher, the higher a velocity of changing said operating position is; and said rudder angle control device makes a magnitude of a reduction rate of said control gain in the gradual reduction of said control gain the smaller, the higher said velocity of changing the operating position is.

4. The vehicular steering control device according to claim 3, characterized in that said rudder angle control device calculates a first control gain on the basis of said size of the deviation between the two operating positions, so as to be smaller as said size of the deviation between the two operating positions becomes smaller; calculates a second control gain which is decreased according to an integrated value of a time during which said steering input device is operated by a driver, a magnitude of rate of the decrease becoming the smaller, the higher a steering operation velocity is; and sets the larger value of said first and second control gains as said control gain.

5. The vehicular steering control device according to claim 2, characterized in that when said size of the deviation between the two operating positions is equal to or less than a reference value, said control gain is 0.

6. The vehicular steering control device according to claim 2, characterized in that said rudder angle control device calculates a target rudder angle of said steered wheel on the basis of a target turning state amount of a vehicle for an automatic steering and said control gain; modifies said target rudder angle by a modification amount for making said size of the deviation between the two operating positions smaller; and controls said rudder angle variable device on the basis of the modified target rudder angle, when said steering mode is switched from said automatic steering mode to said manual steering mode.

* * * * *